US010987865B2

(12) United States Patent
Zheng

(10) Patent No.: US 10,987,865 B2
(45) Date of Patent: Apr. 27, 2021

(54) 3D PRINTING SYSTEMS AND METHODS THEREOF

(71) Applicant: Virginia Tech Intellectual Properties, Inc., Blacksburg, VA (US)

(72) Inventor: Xiaoyu Zheng, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 122 days.

(21) Appl. No.: 16/317,482

(22) PCT Filed: Jul. 13, 2017

(86) PCT No.: PCT/US2017/041964
§ 371 (c)(1),
(2) Date: Jan. 11, 2019

(87) PCT Pub. No.: WO2018/013829
PCT Pub. Date: Jan. 18, 2018

(65) Prior Publication Data
US 2019/0224918 A1      Jul. 25, 2019

Related U.S. Application Data

(60) Provisional application No. 62/489,048, filed on Apr. 24, 2017, provisional application No. 62/361,851, filed on Jul. 13, 2016.

(51) Int. Cl.
*B29C 64/35*      (2017.01)
*B33Y 30/00*      (2015.01)
(Continued)

(52) U.S. Cl.
CPC ............ *B29C 64/35* (2017.08); *B29C 64/112* (2017.08); *B29C 64/135* (2017.08);
(Continued)

(58) Field of Classification Search
CPC ....................................................... B29C 64/35
See application file for complete search history.

(56) References Cited

U.S. PATENT DOCUMENTS 5,140,937 A      8/1992   Yamane et al.
5,315,357 A  *   5/1994   Kamijo ................. G03G 21/10
                                                                    15/256.5
(Continued)

OTHER PUBLICATIONS

International Search Report for PCT/US2017/041964 dated Dec. 26, 2017.

*Primary Examiner* — Alison L Hindenlang
*Assistant Examiner* — George W. Brady
(74) *Attorney, Agent, or Firm* — Carin R. Miller, Esq.; Johnson, Marcou, Isaacs & Nix, LLC

(57) ABSTRACT

Provided herein are 3D printing systems including, but not limited to, 3D printing systems that can, in some aspects, be configured to print multi-materials and/or 3D structures having micro-scale features. In some aspects, the 3D printing system can include a jethead, wherein the jethead can include a body portion, one or more printing material dispensers that are each coupled to one or more feedstock material reservoirs and the body portion, and at least one cleaning unit configured to clean a printed object, a printing platform, a component of an x axis cartridge, or any combination thereof. Also provided herein are scanning projection optical micro-sterolithography systems that can be configured to allow for printing micro-scale features in large scale 3D objects.

13 Claims, 27 Drawing Sheets

(51) Int. Cl.
*B33Y 40/00* (2020.01)
*B29C 64/209* (2017.01)
*B29C 64/336* (2017.01)
*B33Y 10/00* (2015.01)
*B29C 64/112* (2017.01)
*B29C 67/00* (2017.01)
*B33Y 70/00* (2020.01)
*B33Y 80/00* (2015.01)
*B29C 64/135* (2017.01)

(52) U.S. Cl.
CPC .......... *B29C 64/209* (2017.08); *B29C 64/336* (2017.08); *B29C 67/00* (2013.01); *B33Y 10/00* (2014.12); *B33Y 30/00* (2014.12); *B33Y 40/00* (2014.12); *B33Y 70/00* (2014.12); *B33Y 80/00* (2014.12)

(56) References Cited

U.S. PATENT DOCUMENTS

| | | |
|---|---|---|
| 2004/0265413 A1 | 12/2004 | Russell et al. |
| 2005/0104241 A1 | 5/2005 | Kritchman et al. |
| 2015/0290741 A1 | 10/2015 | Abe et al. |
| 2016/0368210 A1* | 12/2016 | Chen ................ B29C 64/245 |
| 2017/0136761 A1* | 5/2017 | Sieradzki ............ B33Y 70/00 |
| 2017/0182708 A1* | 6/2017 | Lin .................... B29C 64/393 |
| 2018/0312784 A1* | 11/2018 | Izadi .................. C08L 83/14 |

* cited by examiner

3D PRINTING SYSTEMS AND METHODS THEREOF

CROSS-REFERENCE TO RELATED APPLICATIONS

This application is the 35 U.S.C. § 371 national stage application of PCT Application No. PCT/US2017/041964, filed Jul. 13, 2017, where the PCT claims priority to, and the benefit of, U.S. provisional application entitled "A METHOD FOR MULTI-MATERIAL ADDITIVE MANUFACTURING AND ITS USE ON PRODUCING MULTI-MATERIALS WITH COMPLEX ARCHITECTURES" having Ser. No. 62/361,851, filed Jul. 13, 2016 and U.S. provisional application entitled "HIGH RESOLUTION SCANNING IMAGE OPTICAL ADDITIVE MANUFACTURING" having Ser. No. 62/489,048, filed Apr. 24, 2017, all of which are herein incorporated by reference in their entireties.

BACKGROUND

Three dimensional (3D) additive manufacturing is a rapidly expanding and powerful manufacturing technique. However, 3D additive manufacturing techniques are still limited in some cases by the types of materials they can be used and the architectures of the structures they can make. As such there still is room for improvement of 3D additive manufacturing techniques.

SUMMARY

In some aspects, described herein are multi-material 3D additive manufacturing systems that can include a jethead, wherein the jethead can have a body portion one or more printing material dispensers that are each coupled to one or more feedstock material reservoirs and the body portion, and at least one cleaning unit configured to clean a printed object, a printing platform, a component of an X axis cartridge, or any combination thereof. In aspects, the cleaning unit can have a brush, wherein the brush is coupled to the body portion, and a cleaning solution dispenser; wherein the cleaning solution dispenser is coupled to the body portion such that when in operation cleaning solution that is dispensed from the cleaning solution dispenser contacts the brush. In some aspects, the cleaning unit can have a cleaning solution dispenser; wherein the cleaning solution dispenser is coupled to the body portion such that, when in operation, cleaning solution that is dispensed from the cleaning solution dispenser contacts the brush, and a fluidic channel system, wherein the fluidic channel system is configured to receive cleaning solution that is dispensed from the cleaning solution dispenser and is further configured to remove used cleaning solution from the fluidic channel system. In some apsects the, cleaning unit can include a brush, wherein the brush is coupled to the body portion, and a cleaning solution dispenser; wherein the cleaning solution dispenser can be coupled to the body portion such that when in operation cleaning solution that is dispensed from the cleaning solution dispenser contacts the brush, and a fluidic channel system, wherein the fluidic channel system is configured to receive cleaning solution that is dispensed from the cleaning solution dispenser and is further configured to remove used cleaning solution from the fluidic channel system. In some aspects, the cleaning unit can have a brush, wherein the brush is coupled to the body portion and is configured to contact printed object, a printing platform, a component of the x axis cartridge, or any combination thereof during operation of the multi-material 3D additive manufacturing system.

In some aspects, described herein are multi-material 3D additive manufacturing systems having a Y axis jet head, wherein the Y axis jethead includes a body portion, one or more printing material dispensers that can each be coupled to feedstock material reservoirs and the body portion, a brush, wherein the brush is coupled to the body portion, a cleaning solution dispenser; wherein the cleaning solution dispenser is coupled to the body portion such that when in operation cleaning solution that is dispensed from the cleaning solution dispenser contacts the brush, an X axis cartridge, wherein the X axis cartridge includes, a body portion, a transparent window, wherein the transparent window is coupled to the body portion, a first fin and a second fin, wherein the first fin and the second fin are coupled to the body portion such that the first fin and the second fin are on opposite sides of the transparent window, and a fluidic channel system, wherein the fluidic channel system is coupled to the body portion and wherein the fluidic channel system is configured to receive cleaning solution that is dispensed from the cleaning solution dispenser and is further configured to remove used cleaning solution from the transparent window, and wherein the brush contacts the first and the second fins twice per motion of the Y axis jethead during operation. In some aspects, the brushes can be polydimethylsiloxane. In some aspects, the transparent window is polydimethylsiloxane. In some aspects, the one or more printing material dispensers are configured to deliver one or more printing materials, and wherein the one or more printing materials can be selected from the group of a polymer, a ceramic, a metal, a metal alloy, a biomaterial, a nanostructured agent, a protein, a nucleic acid, an enzyme, a mulit-element, a pigment, a multi-biomolecule, or any combination thereof. In some aspects, the multi material 3D additive manufacturing system can further include a third fin, wherein the third fin is operatively coupled to the body portion of the X axis cartridge on the same side of the transparent window as the second fin. In some aspects, the multi material 3D additive manufacturing system can further include an optical print head system, wherein the optical print head system is optically coupled to the transparent window. In some aspects, optical print head system is a scanning projection micro stereolithography system. In some aspects, the multi-material 3D additive manufacturing system further includes a light source, a mirror system having at least two mirrors configured to scan the structure being generated, wherein at least one mirror is optically coupled to the light source, and the mirror system is continuously moving during continuously curing a printing material, a bath of uncured printing material, wherein the bath of uncured printing material is optically coupled to the mirror system, a beam splitter, wherein the beam splitter is optically coupled to the mirror system, a video camera, wherein the video camera is optically coupled to the mirror system, and the beam splitter, and a projector, wherein the projector is optically coupled to the bath of uncured printing material and is configured to project continuous video of intergraded image of a subsection of a computer generated layer of product to be printed on the uncured printing material. In some aspects, the multi material 3D additive manufacturing system can further include a body portion, one or more printing material dispensers that are each coupled to one or more feedstock material reservoirs and the body portion, and at least one cleaning unit configured to clean a printed object, a printing platform, a component of the x axis cartridge, or any combination thereof.

In some aspects, also provided herein are micro sterolithography systems that can include a light source, a first mirror configured to scan the X-axis of the structure being generated, wherein the light source is optically coupled to the first mirror, a second mirror configured to scan the Y axis of the structure being generated, wherein the second mirror is optically coupled to the first mirror, a bath of uncured printing material, wherein the bath of uncured printing material is optically coupled to second mirror, a beam splitter, wherein the beam splitter is optically coupled to the first and the second mirrors, a video camera, wherein the video camera is optically coupled to the second mirror, and the beam splitter, and a projector, wherein the projector is optically coupled to the bath of uncured printing material and is configured to project an image of a subsection of a layer to be printed on the uncured printing material. In some aspects, the micro sterolithography system can further include a pair of focusing lenses, wherein the pair of focusing lenses are optically coupled to the light source and the first mirror. In some aspects, the micro sterolithography system can further include a set of reducing optics, wherein the set of reducing optics is optically coupled to the bath of uncured printing material and the second mirror. In some aspects, the micro sterolithography system can further include a nitrogen supply, wherein the nitrogen supply is coupled to the bath of uncured printing material. In some aspects, the micro sterolithography system can further include an oxygen permeable membrane, wherein the oxygen permeable membrane is coupled to a wall of the bath of uncured printing material.

In some aspects, also provided herein are methods of 3D printing micro-scale features in a large scale object having at least the steps of generating a 3D model of a structure to be printed; slicing the 3D model; generating discrete regions in each slice; integrating a projector with an optical scanning print head system; directing an image of the discrete regions of each slice via the projector across two mirrors onto a photosensitive printing material contained in a reservoir; directing a light wave from a light source across the two mirrors and onto the portions of photosensitive printing material having the projected image to cure the printing material to form a layer in a 3D object; moving the 3D object in the reservoir such that a layer of uncured photosensitive printing material overlays the layer that was last cured; and repeating the steps of directing an image of the discrete regions of each slice via the projector across two mirrors onto the photosensitive printing material and moving the 3D object in the reservoir as many times as needed to generate the 3D structure.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 22A, 3 mm; FIGS. 22B-22C, 10 mm; FIG. 22D, 0.4 mm; FIG. 22E, 5 mm; FIG. 22F, 75 µm; FIG. 22G, 40 µm; FIG. 22H, 150 µm; and FIG. 22I, 50 µm.

FIG. 24A, 150 µm; FIG. 24B, 400 µm; and FIGS. 24C-24D, 250 µm.

DETAILED DESCRIPTION

Figure 1:
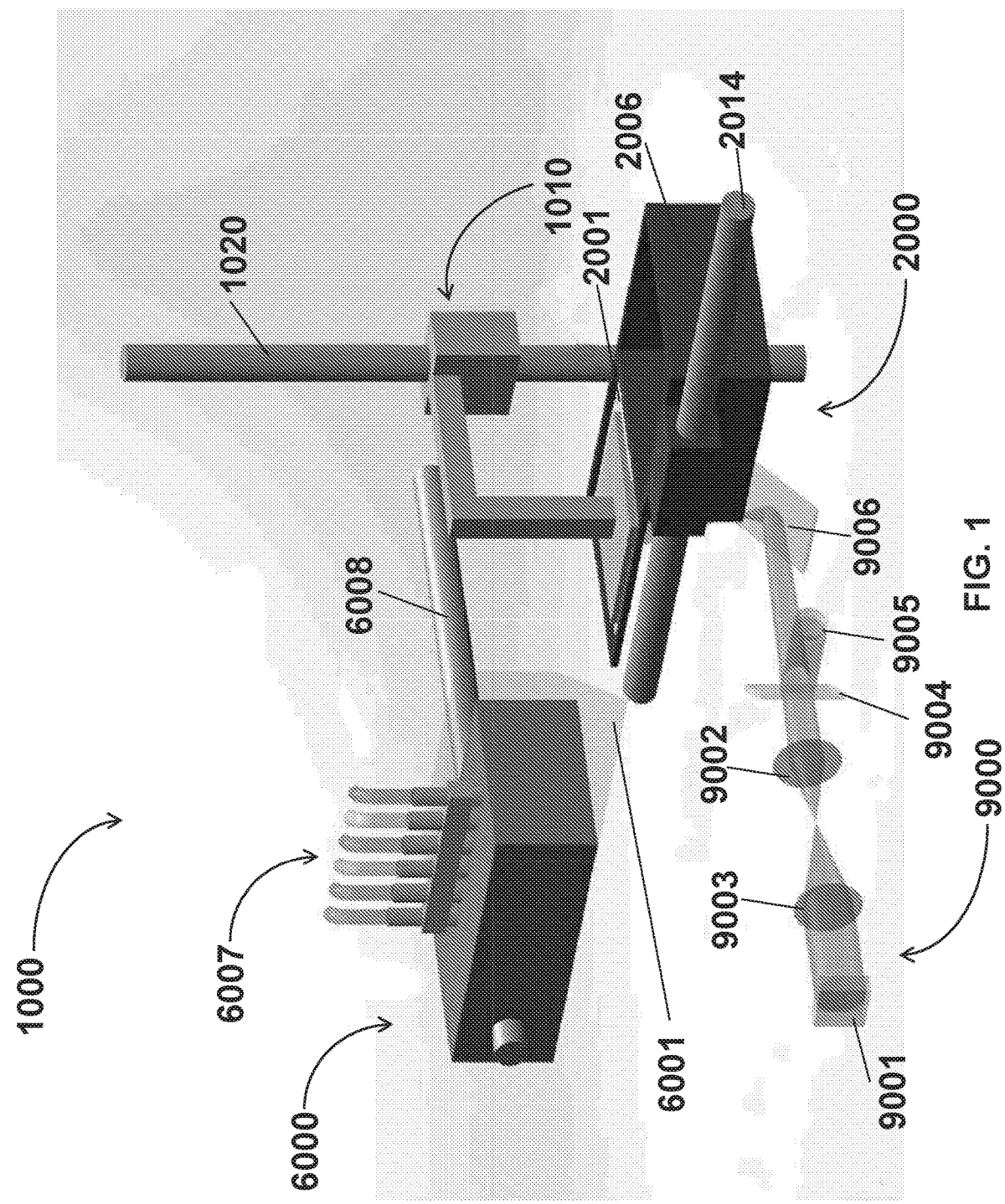
FIG. 1 shows one embodiment of a multi-material 3D printing system having an in-situ cleaning and feedstock delivery components. The system can have four major component systems: a Y axis material jethead, a Z axis elevator, an X axis cartridge, and an optical printing head system.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of mechanical engineering, physics, computer science, chemistry and the like, which are within the skill of the art. Such techniques are explained fully in the literature.

Discussion

Stereolithographic (SL) 3D printing a photoreactive resin is used as the printing material, which is cured by an optical jet head to form the solid printed material. Typically 3D SL printers rely on large baths of photo reactive polymer resin and are unable to fabricate layers formed of more than one material type. More recently SL 3D printers have been developed that have some capability to print objects with that contain multiple materials, but these are not without drawbacks. These 3D printers suffer from contamination due to mixing of the materials used resulting from incomplete cleaning of various components of the printing system. As such, there still exists a need for SL 3D printers capable of printing 3D objects with more than one material.

A separate challenge for the 3D manufacturing industry is the printing of 3D structures with micro-scale features. Such structures include, but are not limited to, highly detailed and high performance components for a variety of applications ranging from tissue engineering scaffolds, energy storage materials, chemistry reactionware, to microfluidics, and ultralight-ultra strong materials. Only a few manufacturing techniques exist to fabricate micro-scale 3D structures, such as two-photon polymerization, mask lithography, and galvo-mirror based large area projection micro-sterolithography. However, these techniques are not without their drawbacks and limitations. Particularly, there is a trade-off between the overall part size, manufacturing speed, and achievable level of detail. For two-photon polymerization, the choices of resins are severely limited due to the need for them to be highly transparent to the laser beams used to cure the material. Mask lithography is limited by the time-consuming process of mask alignment and difficulties in creating high aspect ratio features. Further, conventional mask-based lithography is not capable of creating structures on curved surfaces. The resolution of galvo mirror projection stereolithography is greatly limited by the challenge of achieving consistent focusing, as the projection light directed from the galvo mirror is focused onto different planes. This adds significant complexity and cost of designing customized lens to correct the spherical aberrations of light rays traveling through the lens. This conventional method is further limited by the pulse motion of the mirror and the fact that the light pattern cannot be continuously scanned, which causes longer printing time and discontinuity for the printed structure. As such, there exists at least a need for improved additive manufacturing methods for fabrication of 3D structures with micro-scale features.

With that said, described herein are 3D SL printing systems and component systems thereof that can be capable of printing multi-material 3D objects. In some embodiments, the 3D SL printing systems described herein can include a Y axis jethad component system that can house the material feedstock reservoirs and an X axis cartridge component system that can include an in-situ cleaning system that can be configured to remove any remaining first printing material to avoid contamination with a second printing material. The 3D SL printing system described herein can further include a Z axis elevator and an optical printing head component system.

Also described herein are aspects of a scanning optical projection micro-sterolithography (micro-SL) system that can allow for the fabrication of highly detailed materials with multiscale features that can range in size all the way down to the sub-micron scale. The scanning optical micro-SL system described herein can be used with the 3D SL printing system described herein or other SL 3D printing systems known in the art. In some aspects, the scanning optical micro-SL system can include creating a 3D model of the 3D object, slicing the 3D model into slices, subdividing the slices for each layer into discrete regions, combining the subdivided slices for each layer to create a video for any given slice, playing the created video on the 3D SL printing system and synchronizing the motion of the light beam by the beam steering system, curing the slice, lowering the completed the slice of the model into curable resin to form a new curable resin layer over the finished slice of the model, repeating the steps from video creation to lowering the completed slice of the model into curable resin as many times as needed to complete the 3D structure based on the 3D model.

Other systems, components, compositions, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Multi-Material 3D SL Printing Systems

Discussion of the multi-material 3D SL printing system begins with FIG. 1, which shows an embodiment of a 3D SL printing system 1000. The mutli-material 3D SL printing system can include a cleaning system that can include one or more brushes on a jethead, fins on an X axis cartridge or similar component, and/or a fluidic cleaning system configured to dispense a cleaning solution onto the printed structure, the printing platform, a brush (if present), a component of the X axis cartridge or any combination thereof. In some aspects, the multi-material 3D SL printing system can have four component systems: a Y axis material jethead 6000, a Z axis elevator 1010 that hosts the printing platform 1020, an X axis cartridge 2000, and an optical printing head 9000. Generally, in operation the Y axis jethead 6000 moves back and forth along the Y axis over the X axis cartridge 2000, which can be moved along the X axis by an actuator that can include an actuator arm 2014. As this occurs feedstock printing material can be fed from feedstock reservoirs that are part of or coupled to the Y axis jethead 6000 through a conduit and out a dispenser nozzle over a transparent window in the X axis cartridge 2000. Light from the optical print head 9000 can be directed from a source and up through the transparent window in the X axis cartridge 2000 to activate and cure the feedstock printing material to form a solid printed layer. Brushes, which can be made of PDMS, that are part of the Y axis jethead 6000 can be swiped across and come in contact with the surface of the window in the X axis cartridge 2000 by an actuator system that includes an actuator arm 6008. During this pass, the brush(es) can any residual uncured feedstock printing material as the Y axis jethead 6000 moves. Additionally, the Y axis jethead 6000 can include a cleaning solution dispenser that can dispense a cleaning solution onto the brushes, fins, other components of the X axis cartridge, and/or the 3D structure being generated. The cleaning solution can be collected in a reservoir that can be coupled to the X axis cartridge 2000. The used cleaning solution can be removed from the reservoir via an outflow channel, which can reduce or eliminate cross-contamination of printing materials. Also, fins present on the X axis cartridge can come in contact with the brush(es) of the Y axis jethead 6000 and can remove residual uncured printing material from the brush(es) prior to the brush(es) coming in contact with the transparent window and after. After a layer has been cured, the printing platform 1010 can be moved along the Z axis by an actuator system that includes an actuator arm 1020, which positions the printing platform and printing structure in position for the next layer or part of the layer to be formed.

Figure 2:
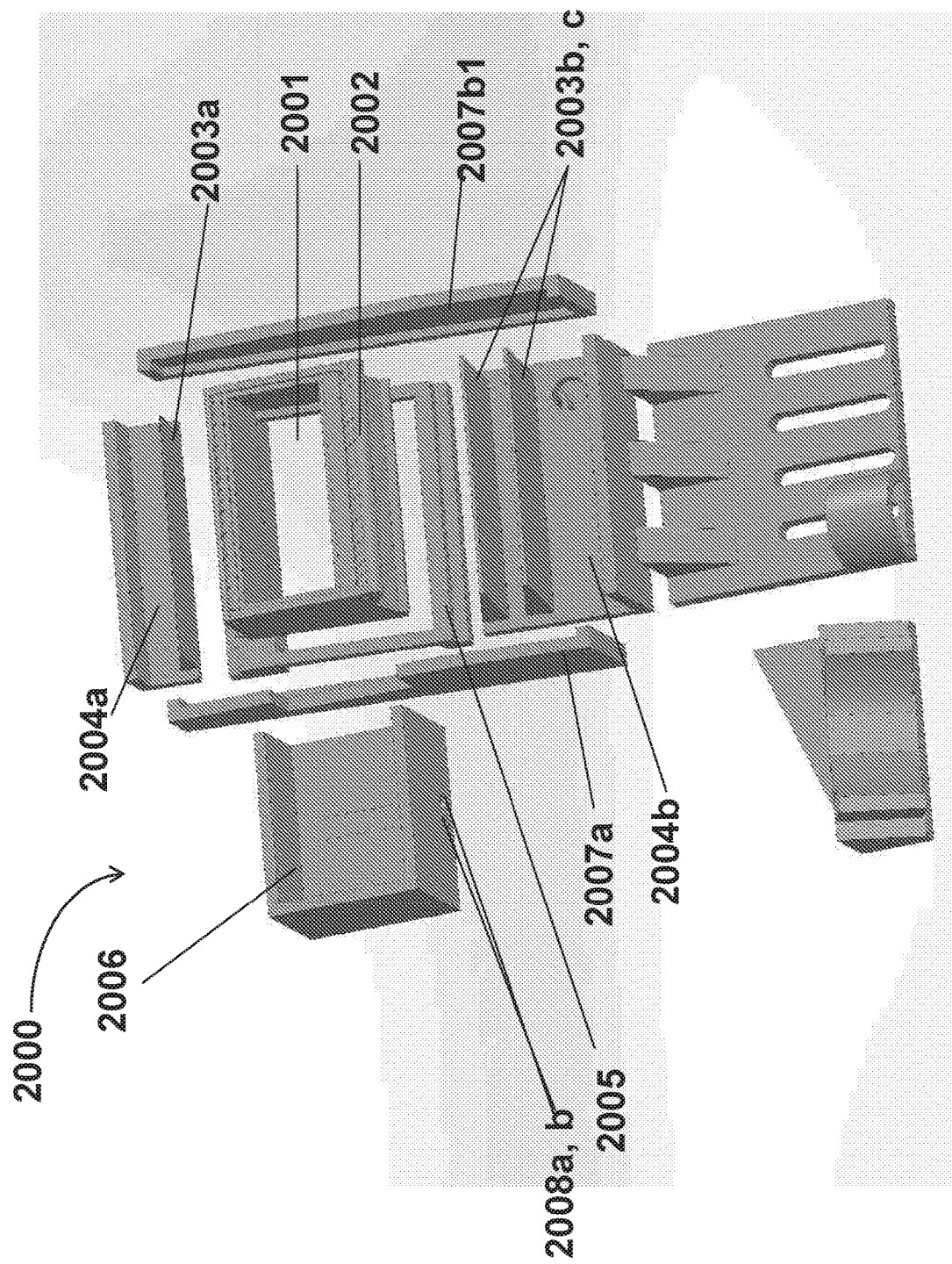
FIG. 2 shows an exploded view of an embodiment of the X axis cartridge.
Figure 3:
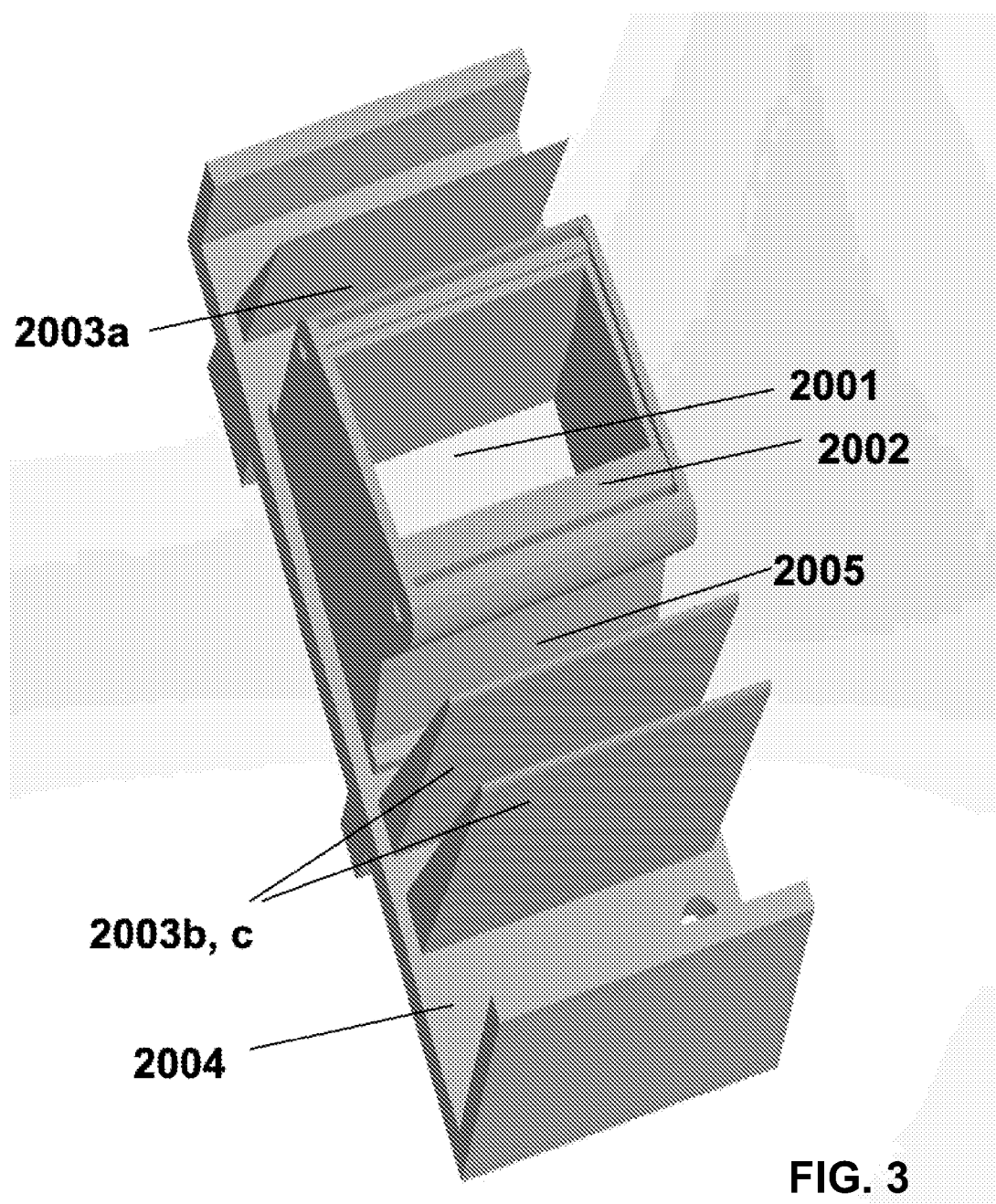
FIG. 3 shows an embodiment of the integrated fins on the X axis cartridge.
Figure 4:
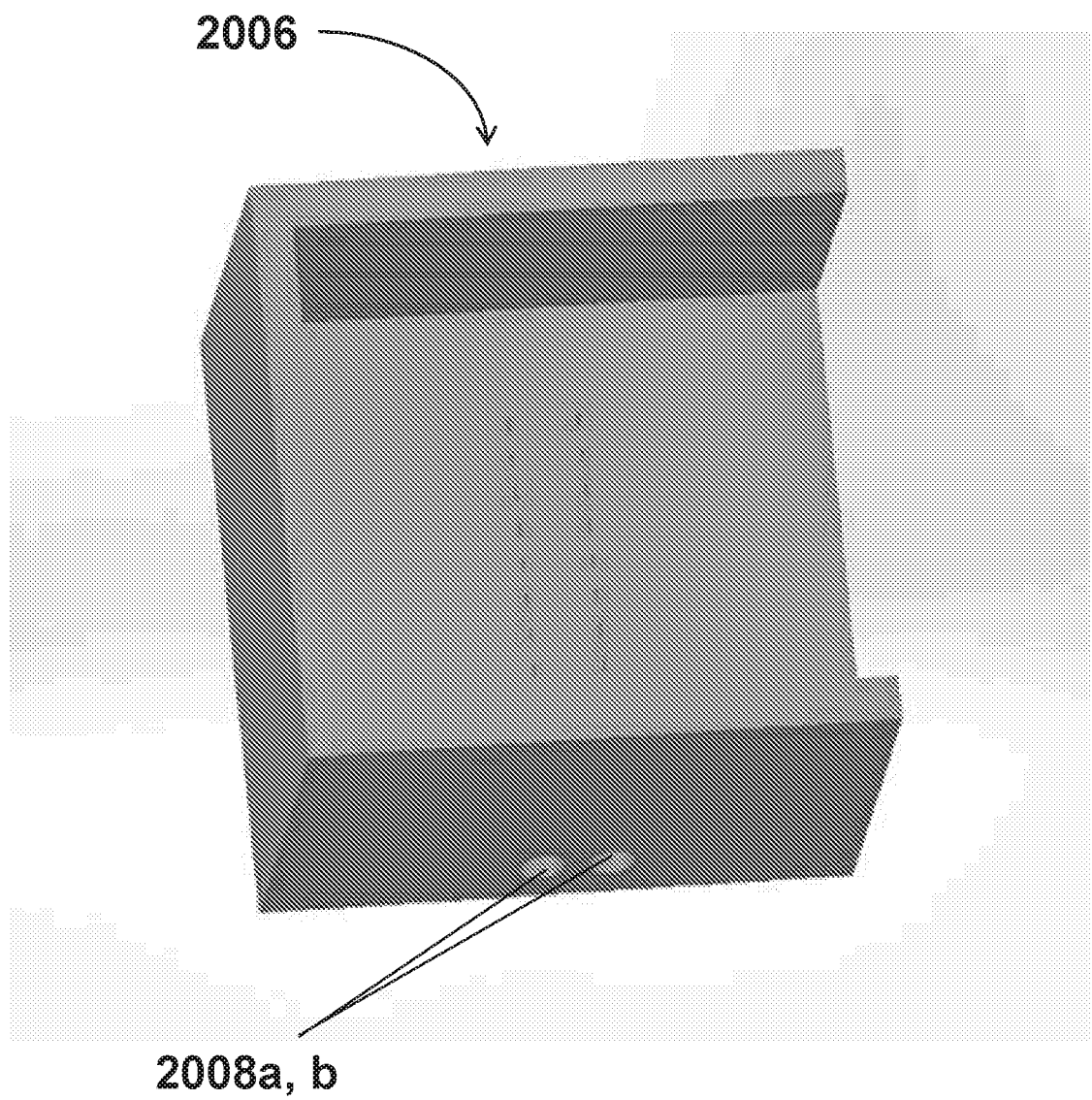
FIG. 4 shows an embodiment of an open-flow channel fluidic system that can be part of the X axis cartridge component system.

With the general features of the 3D SL printing system in mind, attention is directed to FIGS. 2-4 which show an exploded view of an embodiment of the X axis cartridge 2000 (FIG. 2), a view of the window and fin component portion of the X axis cartridge (FIG. 3) and a detailed view of an embodiment of the fluidic channel system (FIG. 4). The X axis cartridge 2000 can contain a transparent window 2001 that is contained in a window frame 2002. The window frame can be attached to a window support member 2005, which in turn can be coupled to other components of the X axis cartridge as described herein and as shown in e.g. FIGS. 2-3. The transparent window 2001 can be made of any suitable material that will allow light, such as ultra violet (UV) light to pass through so as to allow the light to activate and polymerize the printing material feedstock. Suitable materials include, but are not limited to polydimethylsiloxane (PDMS). The window can have a length, a width, and a thickness. The transparent window 2001 can be any suitable shape or size. In some embodiments, the length and the width can each range from about 0.5 cm to 50 cm or more. The thickness of the transparent window 2001 can range from 0.001 mm to 10 cm or more. The transparent window frame 2002 can have dimesons so as to form a frame surrounding the transparent window.

The X axis cartridge can have one or more fins. In operation the fins can come in contact with the brush(es) on the Y axis jethead. As will be discussed in greater detail below, as contact is made, residue printing material resins are scraped off the brushes and onto the dyring members 2007a, b (collectively 2007). For each brush motion, the brush is scraped twice by the fin(s) before the brush cleans the transparent window 2001. The number of fins can range from 1 to 10 or more. The embodiment shown in FIG. 2 has three fins 2003a, b, and c (collectively 2003). In embodiments where there is more than one fin, the fins can be attached to support members 2004a,b (collectively 2004) on each side of the transparent window 2001. The support members can be integrated with or otherwise attached or coupled to the window support 2005, window frame 2002, and/or transparent window 2003. It will be appreciated that the support members 2004, 2005 can be one continuous member or be separate members that can be attached or otherwise coupled to one another in the X axis cartridge.

Existing multi-material SL 3D printing systems use a tank reservoir to store a cleaning solution (e.g. ethanol) for completing a washing process. However, these systems still suffer from cross-contamination of the different materials because the tank reservoir is easily contaminated with a small amount of resin and the contaminated cleaning solution is used in subsequent washing steps and thus contaminates the next layers printed. In contrast, the X axis cartridge described herein can also have a fluidic channel system 2006, which can be integrated with and or coupled to the support members 2004, 2005 and/or drying support members 2007 and is configured to perfuse unused cleaning solution into the system and perfuse used cleaning solution out of the system. In operation, columns of micro slots perfuse cleaning solution onto the building substrate and used cleaning solution can flow to a waste outlet. Thus unlike conventional cleaning systems on SL 3D printing systems, the X axis cartridge cleaning system is not stored inside the chamber.

A detailed view of the portion of the fluidic channel system that can be physically coupled to the X axis cartridge is shown in FIG. 4. The fluidic channel system can be configured to allow for cyclic washing of residue printing material feedstock resins layer by layer without contamination of the printing chamber. The fluidic channel system 2005 can be an open microfluidic channel system. In the fluidic cannel system 2005 columns of micro slots 2008a, b (collectively 2008) in an open reservoir 2014, can be utilized to perfuse a suitable cleaning solution that is dispensed from a cleaning solution dispenser on the Y axis jethead (discussed below) onto the building substrate. The used cleaning solution can then flow to the waste outlet and not be stored inside the building chamber. Suitable cleaning solutions will depend on, inter alia, the type of printing material being used. Suitable cleaning solutions can include, but are not limited to, ethanol. The surface 2009 of the fluidic channel system that faces towards the part to be washed can be flat to protect the part being built from any physical damage.

Figure 5:
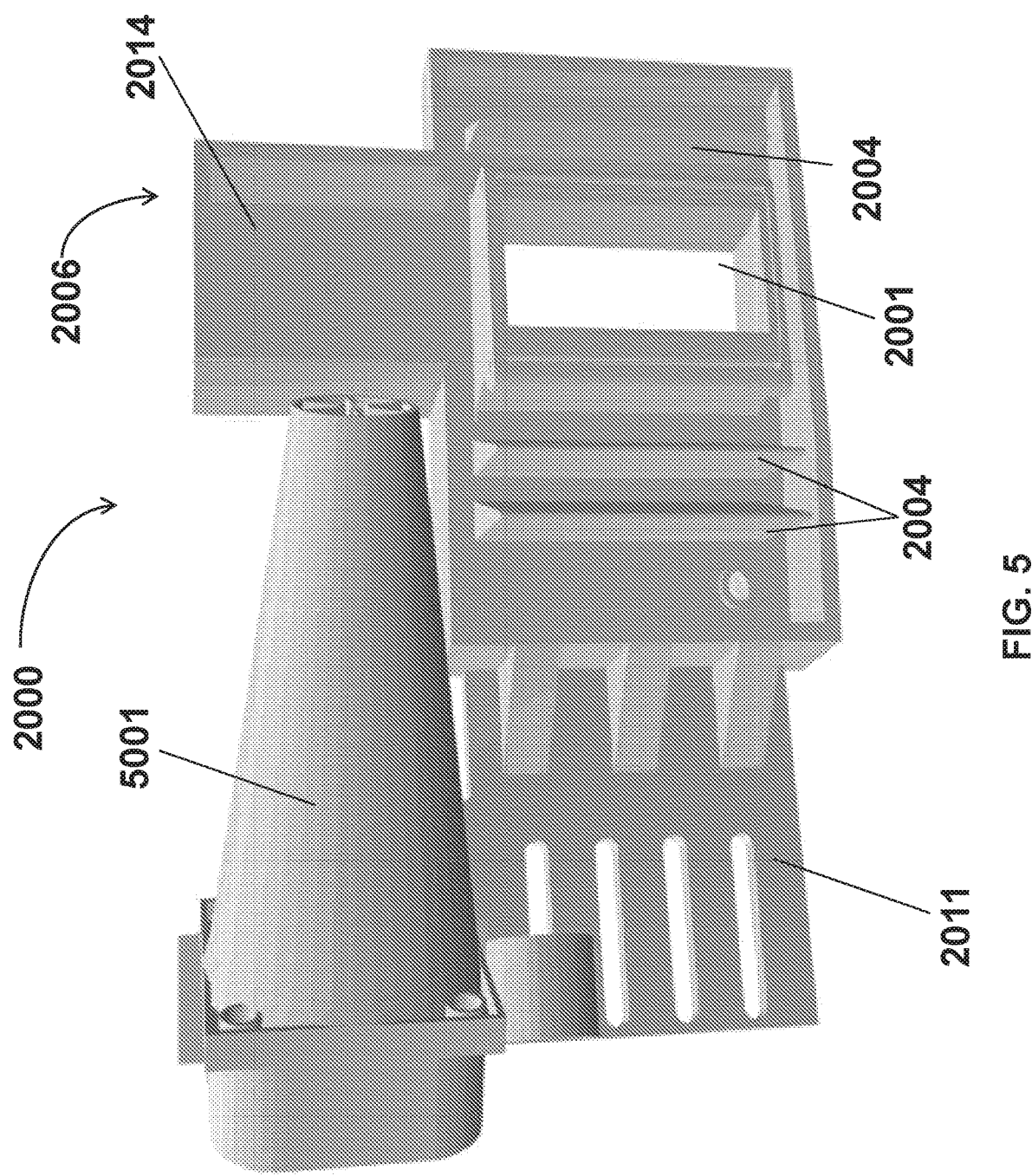
FIG. 5 shows an embodiment of an X axis cartridge component system that can include a micro-blower.

The X axis cartridge can be configured to dry in addition to cleansing. In some aspects and as shown in FIG. 5, the X axis cartridge can be integrated with one or more fans 5001. In some aspects, the fan can be a microblower fan.

In addition to the fluidic channel cleaning system, brush(es), and/or cleaning fins described above with respect to the X axis cartridge, the 3D SL printing system described herein can include a Y axis jethead that can include one or more brushes that can move across the transparent window with each motion of the Y axis jethead. With this in mind, discussion of aspects of a 3D SL system continues with FIGS. 6-7, which shows various aspects of a Y axis jethead 6000. As described above, the Y axis jethead 6000 can have one or more brushes 6001a,b (collectively 6001) that can come in contact with the transparent window and/or fin(s) of the X axis cartridge. The brush(es) 6001 can be made out of a suitable material. Such suitable materials include, but are not limited to, PDMS. The brush(es) 6001 can have a length (I), a width (w), and height (h). The length, width, and height can, in some embodiments, each range from 0.001 mm to 50 cm or more and any range in between. The brush(es) 6002 can be any suitable size and shape. The Y axis jethead 6000 can also include an actuator that can be coupled to an actuator arm (FIG. 1, 6008) upon which the Y axis jethead 6000 can move along during operation.

Figure 6:
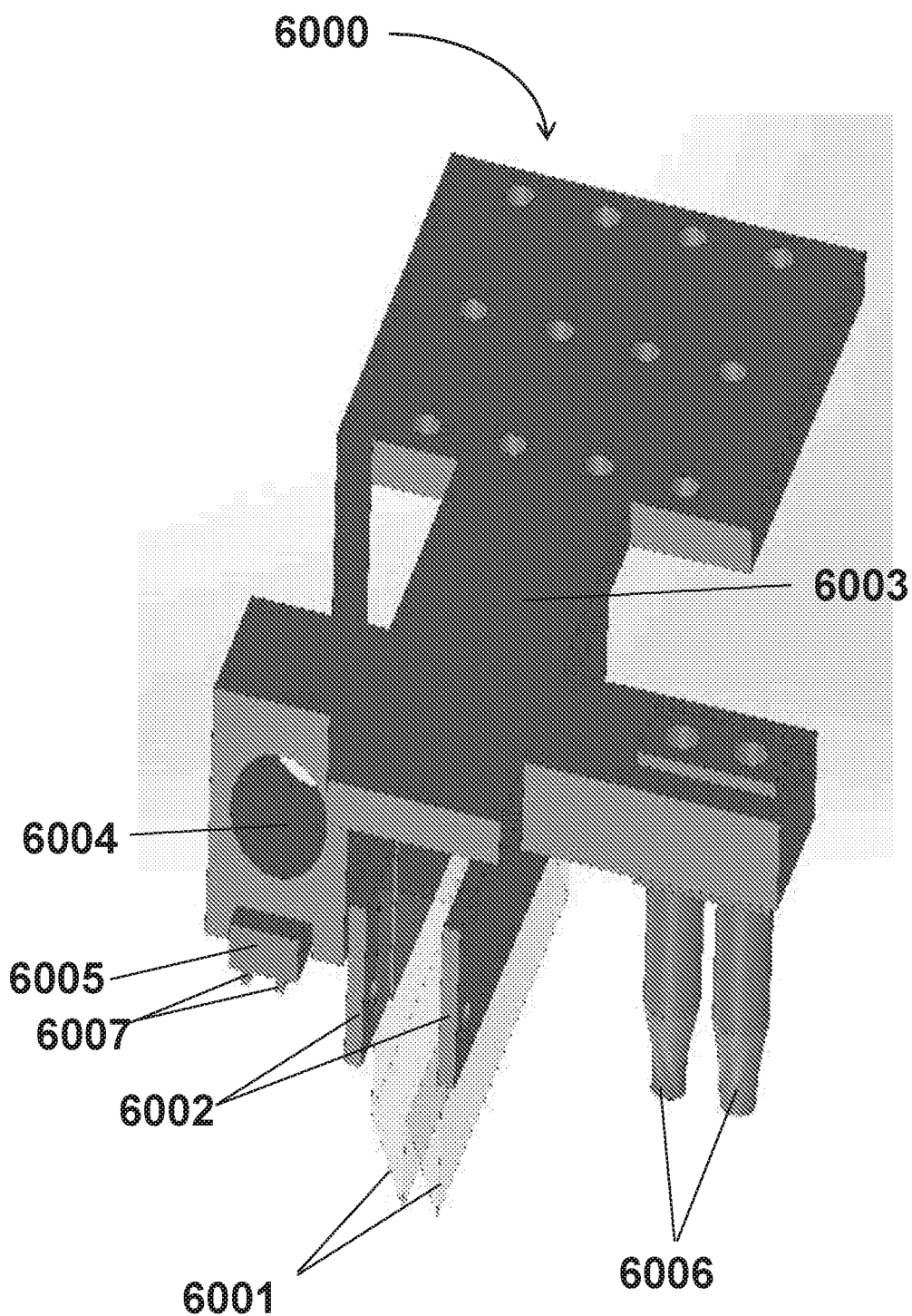
FIG. 6 shows an embodiment of a Y axis material jethead.

The brush(es) 6001 can each be coupled to a support member 6002a,b (collectively 6002). The support member 6002 can be integrated with or otherwise coupled or attached to a body portion 6003 of the Y axis jethead. The body portion 6003 can be fabricated as one continuous piece or can be fabricated as multiple sections that are attached or otherwise coupled to each other to form the body portion 6003. The body portion 6003 can be configured to receive and/or couple to an actuator. In operation the actuator can move the Y axis jethead along the Y axis. In some aspects, as shown in FIG. 6, the Y axis jethead can contain an opening 6004 configured to receive an actuator.

Figure 8:
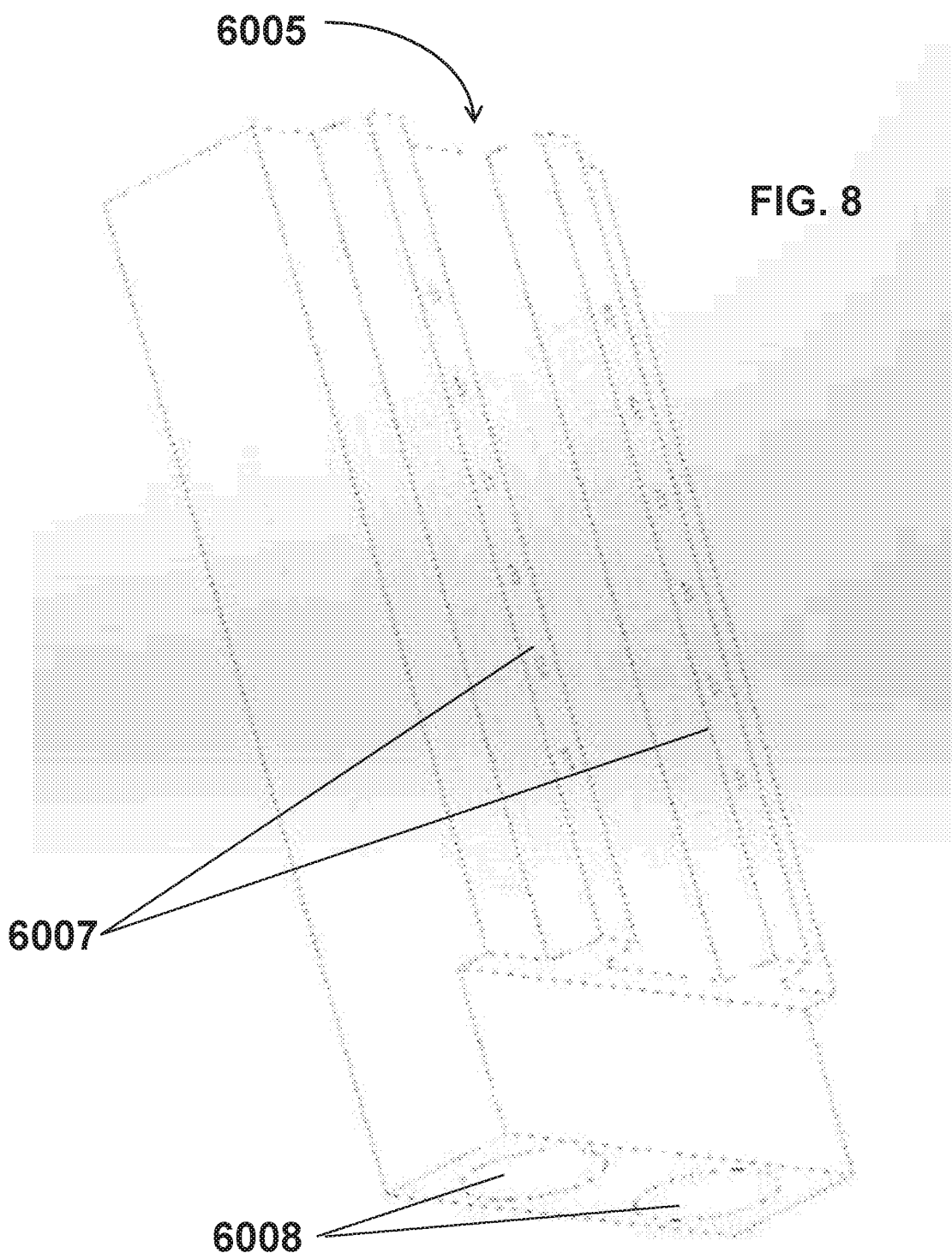
FIG. 8 shows an exploded view of an embodiment of a micro-fluidic channel configured to pump ethanol or other solvent onto a print platform.

The Y axis jethead can have a cleaning solution dispenser 6005 that can be attached to the body portion 6003 of the Y axis jethead. In operation a suitable cleaning solution (discussed above) is perfused onto the brushes, fins, and object being printed to remove any residue printing material. The used cleaning solution can be collected in the reservoir 2014 of the portion fluidic microchannel cleaning system physically coupled to the X axis cartridge. The used cleaning solution can then be passed out of the reservoir 2014 through a waste outlet and discarded. FIG. 8 shows an exploded view of the cleaning solution dispenser 6005 configured to pump a cleaning solution onto the printing platform. In some aspects, the brush(es) 6001 can be efficient enough to clean the transparent window and/or printing platform. However, for some printing materials, including but not limited to, some chemicals, ceramic powders, and silica carbide, the brush(es) are not enough or additional cleaning is desired. Thus, in some aspects the Y axis jethead can include the cleaning system that can include the Y axis cleaning solution dispenser 6005. The cleaning solution dispenser 6005 can include microfluidic channels 6007 that can dispense the cleaning solution. The microfluidic channels 6007 can be coupled to suitable conduit that can be configured to deliver the cleaning solution from a source to the cleaning solution dispenser. The cleaning solution dispenser 6005 can be configured to receive the suitable conduit (e.g. via receiving openings 6008, FIG. 8). Additionally, the use of the cleaning system can add lubrication to the system that can help prevent particles in the printing material from sticking to components of the printing system (e.g. the transparent window). In some aspects, the cleaning solution dispenser 6005 can be coupled to the body portion 6003 such that the cleaning solution is deposited in front of the brush(es) 6001 as they move across the transparent window.

Figure 7:
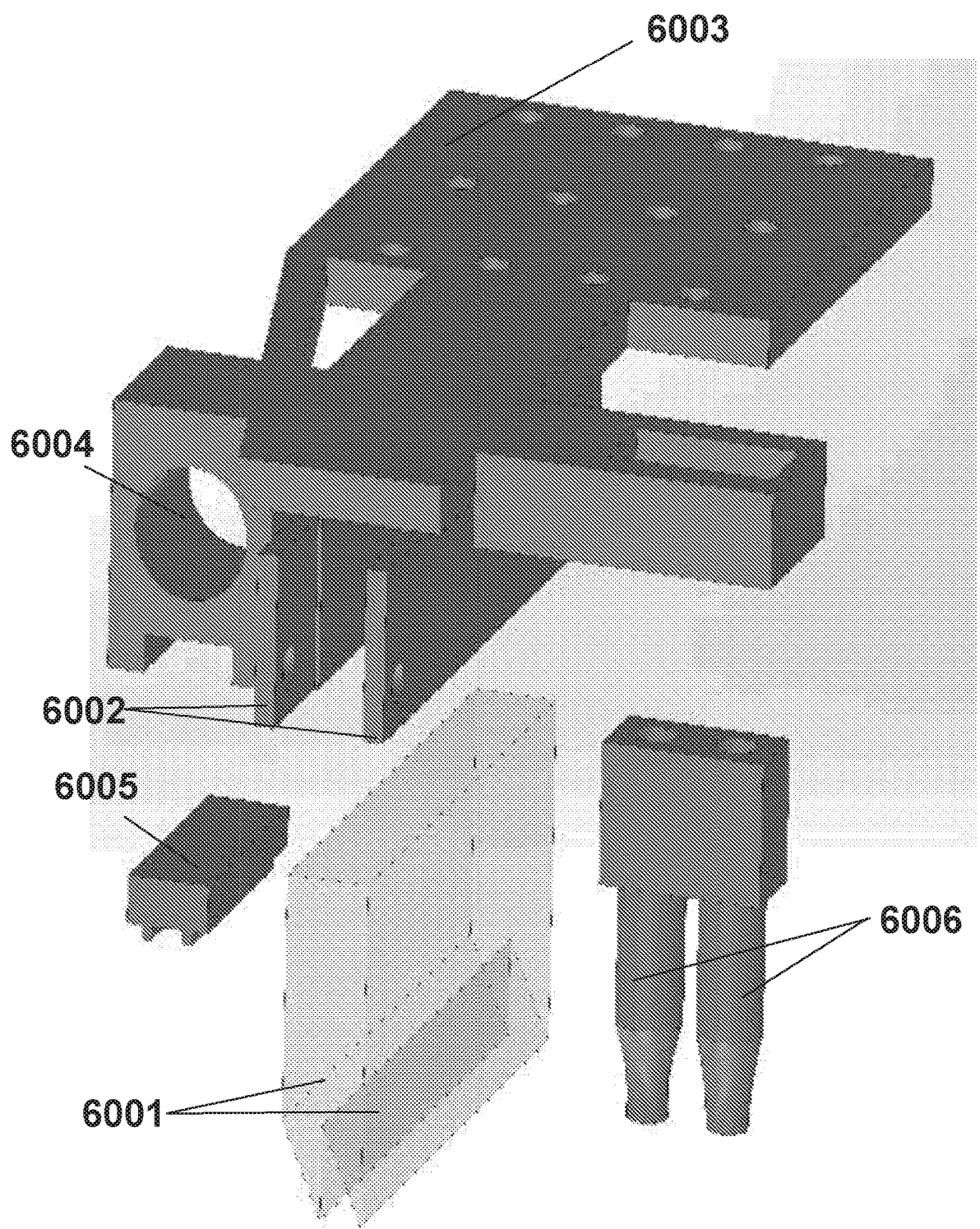
FIG. 7 shows an exploded view of the embodiment of the Y axis material jet head shown in FIG. 6.

The Y axis jethead 6000 can also include one or more material dispensers 6006 a,b (collectively 6006) that can be configured to dispense uncured printing material, which can be attached to or otherwise coupled to the body portion 6003 of the Y axis jethead 6003. The material dispensers 6006 can be any suitable shape and size. The material dispensers 6006 can be tapered at one end so as to form a nozzle. The dispensers 6006 can contain a void extending though the interior of each dispenser 6006 to allow the flow of printing material through the dispenser(s) 6006. In some aspects, the dispensers 6006 can be individually be integrated with the body portion 6003. In other aspects, the dispensers 6006 can be integrated with each other into a jetting tube unit which can then be coupled to the body portion 6003 (e.g. as shown in FIG. 7). The system can also be referred to as an extensible multi-material sterolithography system because the user can extend the number of materials that can be used with the system by changing the jetting tube configuration to include any number of dispensers as desired. The dispensers can be integrated with or be configured to couple to one or more tubes or other suitable conduit that connects to the material feedstock reservoirs (see e.g. FIG. 1, 6007) and through which the printing material can flow. Thus the body portion can be configured, in some aspects, to couple to one or more feedstock reservoirs. In other aspects, the feedstock reservoirs are not directly attached to the Y axis jethead but can be outside of the 3D SL printing system and connected to the dispensers 6006 via tubing or other suitable conduits through which the printing material can flow or otherwise be passed.

Figure 9:
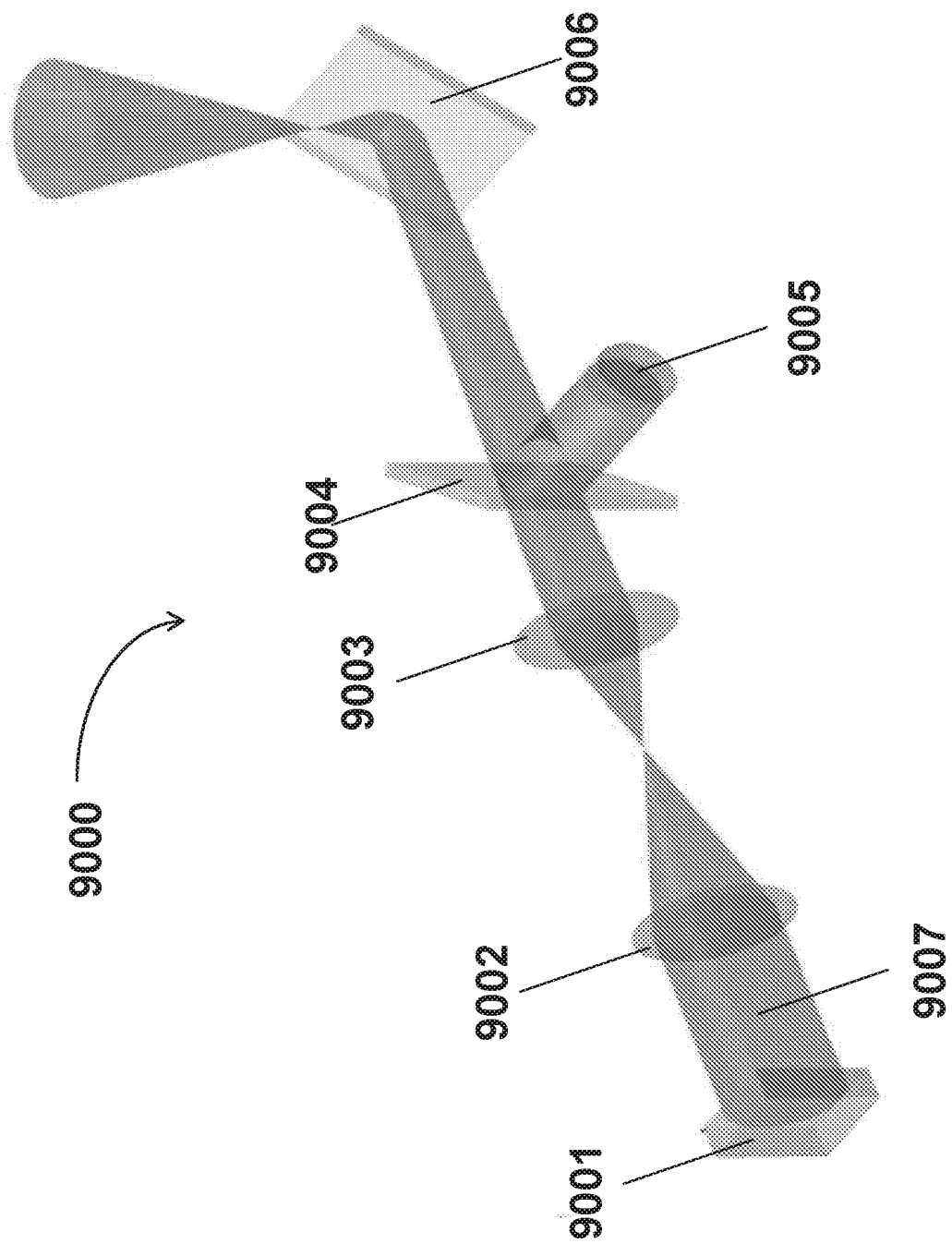
FIG. 9 shows an embodiment of an optical printing head system.

The 3D SL printing system described herein also include an optical system that can generate and/or direct a light wave or other electromagnetic energy to contact the uncured printing material. The optical system can be optically coupled to the transparent window of the X axis cartridge. With this in mind attention is first directed to FIG. 9, which shows one embodiment of an optical system 9000 that can be used with a 3D SL printing system, including but not limited to the 3D SL printing system described herein. In some aspects, a suitable light source 9001 can be optically coupled to a first focusing lens 9002. The first focusing lens 9002 can be optically coupled to a second focusing lens 9003. The second focusing lens 9003 can be optically coupled to a beam splitter 9004. The beam splitter 9004 can be optically coupled to a lens of an optical device 9005 and a mirror 9006 configured to direct the light to the transparent window. In some aspects, the light source can be a light emitting diode, laser, DMD projector chip, or other suitable light source. The light source can emit one or more wavelengths of light or other electromagnetic energy 9007. Wavelengths of light or other electromagnetic energy 9007 can be emitted simultaneously or sequentially. The wavelength of light emitted will depend in part on the type of printing material being used. In some embodiments, the wavelength of light can be a ultra-violet wavelength. In some aspects, the wavelength of light can be an infrared wavelength of light. In some aspects, the wavelength of light can be a visible wavelength of light. The first 9002 and second focusing lens 9003 can be any suitable size, shape, and material.

Suitable printing materials can include but are not limited to any photosensitive material. As used herein the term "photosensitive" can be used to refer to a material that changes from an uncured to a cured state (or from a monomeric to a polymeric) state when exposed to a suitable wavelength of light or other electromagnetic radiation. The photosensitive material can be in a liquid or flowable form prior to exposer to light or electromagnetic energy and can transform into a solid state after exposure. Suitable printing materials can include, but are not limited to polymers, co-polymers, ceramics, metals, metal-alloys, biologic materials (including, but not limited to, nucleic acids and proteins). The printing material can include additional functional agents including, but not limited to, a nanostructured agent (e.g. nanowires and carbon nanotubes), enzymes, multi-element molecules, or multi-color molecules, and/or multi-biomolecules.

Scanning Optical Projeciton Micro-SL Systems

As discussed above, it can be desirable to manufacture 3D structures with micro-scale features. With this in mind attention is directed to FIGS. 20-21 and 25-27, which show embodiments of a scanning optical projection micro-SL system 20000, FIGS. 20 and 25-27 and method 21000, FIG. 21 that can be used with a 3D SL printing system, including but not limited to the 3D SL printing system described herein that can be capable of increasing the resolution of a SL 3D printing system including, but not limited to, the 3D SL printing systems provided herein as well as other SL 3D printing systems. The scanning optical projection micro-SL system can improve the resolution of a 3D SL printing system and allow for generation of 3D structures with microscale features. Further, the scanning optical projection micro-SL system can allow for continuous printing, which can greatly reduce the total printing time.

Figure 20:
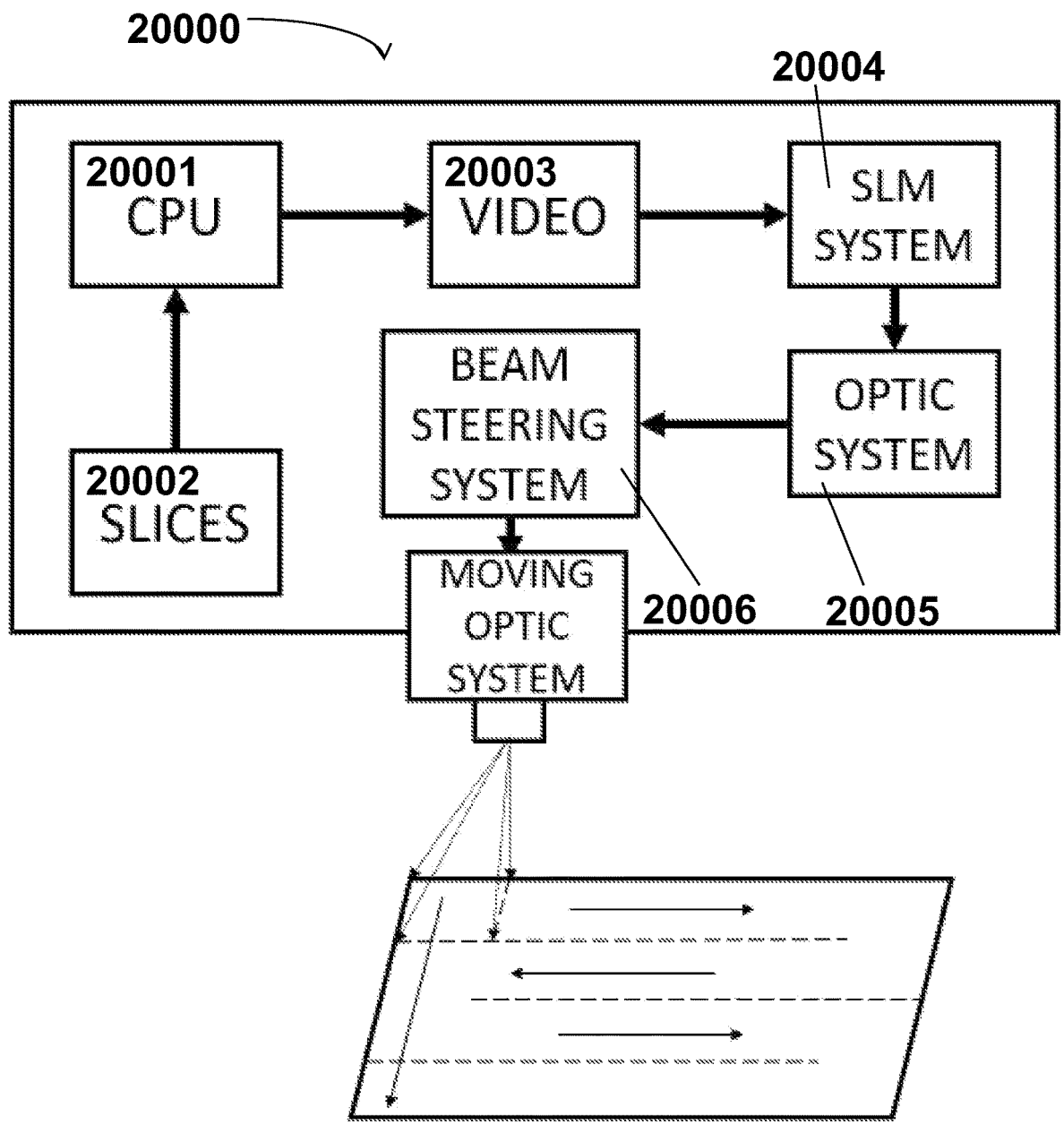
FIG. 20 shows a schematic of one embodiment of a scanning optical micro-sterolithography (micro-SL) system that can have integrated video playing.

As shown in FIG. 20, the scanning optical projection micro-SL system 20000 can include a processer that can be incorporated into a computing device 20001 that can be configured to process slices 20002 of the layers of a 3D model of the 3D structure to be generated. The processed slices can be used to generate a video 20003 of the slice being processed. The video 20003 can then be played on the SLM system 20004 and the motion of the light beam of an optic system 20005 can be synchronized by a beam steering system 20006 and be continuously in motion to form a moving optic system 20007 that continuously cures a printing material to form a layer of the 3D structure.

Generally in operation, a 3D model of the structure to be manufactured can be first sliced into 2D patterns. These 2d patterns are sequentially transmitted to a special light modulator, which can be illuminated with ultraviolet (UV) light from a light source, such as a light emitting diode (LED) array or other suitable slight source. Each image can then be projected through reduction optics onto the surface of a photosensitive printing material. The light exposed liquid printing material cures, forming a layer in the shape of the 2D image, and the substrate on which it rests is lowered, reflowing a thin film of uncured printing material over the cured layer. The image projection process is then repeated, with the next image slice forming the subsequent layer. The capability of the system can be further expanded by including an optical scanning system to produce large scale 3D structures with microscale resolution. A section of the image from the light modulator can be reflected from two mirrors (e.g. embodiments shown in FIGS. 25-27) onto the film of uncured printing material. As the mirrors move on the x-axis or y-axis, 2D patterns are reflected onto a new area next to the previously exposed area. The pattern change on the projector can be coordinated with the scanning rate of the scanning mirror system. Thus, the fabrication speed can be adjusted by adjustment of the scanning rate. A focusing lens can be used below the scanning mirror to project the image onto the uncured printing material. The pattern can be updated as the image is moved via the scanning optics to effectively create a continuous image in the photosensitive printing material. As the scanned image is much larger than a single image of the projector, the small feature size over a large area can be obtained by the scanning optical projection micro-SL system.

Figure 21:
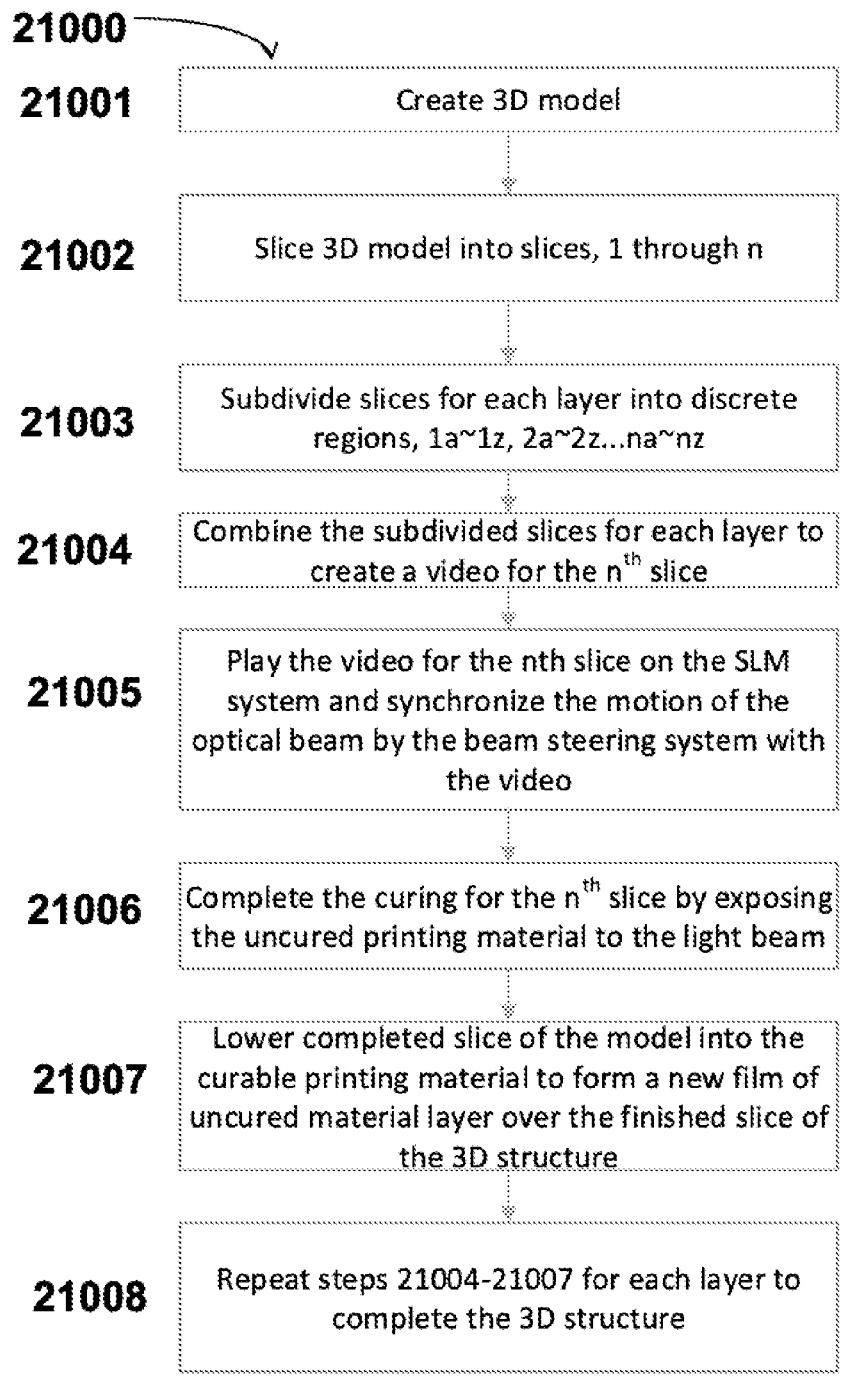
FIG. 21 shows a flow diagram that can demonstrate one embodiment of operation of a scanning optical micro-SL system.

FIG. 21 shows a flow diagram demonstrating one embodiment of the methodology 21000 of the scanning optical projection micro-SL system. The process can begin with generation of a 3D model 21001. The 3D model can next be sliced into slices (e.g. 1 through n) 21002. Then the slices for each layer can be subdivided 21003 into discrete regions (e.g. 1a~1z, 2a~2z . . . na~nz). Next, the subdivided slices can be combined for each layer to create a video for the $n^{th}$ slice 21004. The video can then be played 21005 for the $n^{th}$ slice on the SLM system. In this step the video can be projected onto the surface of the uncured printing material. The motion of the optical beam can be synchronized by the beam steering system with the projected video by the moving optic system. As the printing material is cured by exposure to the optical beam, curing for the $n^{th}$ slice is completed 21006. After curing, the completed slice of the 3D structure is lowered such that uncured printing material flows over the recently completed layer to from a new uncured layer of printing material over the finished slice of the 3D structure 21007. Steps 21004 through 21007 are repeated 21008 as many times as needed until each 3D structure is formed as desired.

The scanning optical projection micro-SL system can be further expanded upon by including a lens turret in the optic system FIG. 20, 20005 that can include reduction optics (see e.g. FIGS. 26-27) having different magnification powers. The resolution and the size of the single image can be accommodated using the turret. As a result of the variation of the optics with different magnification, the focusing distance can also vary. Thus, an auto focusing sequence can also be integrated into the scanning optical projection micro-SL system. The optic system of the scanning optical projection micro-SL system can be calibrated by projecting a calibration image onto the surface of the uncured printing material with a light intensity that is lower than that of the reactive threshold of the printing material. A CCD camera can be used to collect the projected patterns and send them back to the control system (e.g. the Beam steering system and/or CPU). Before printing, the height of the film of uncured printing material can be automatically adjusted to the desired focusing distance based on different reduction optics.

The height of the printed parts can be extraordinarily limited by the height of the bath of uncured printing material. In some aspects, the scanning optical projection micro-SL system can be inversed to be an up-side-down system. However, the separation force between the printing stage and the transparent window (which can be e.g. a PDMS membrane) can destroy the microstructures. In some aspects, an oxygen environment can be provided to enlarge the unreactive zone between the stage and the transparent window (e.g. a PDMS membrane). The permeability of the transparent window can also be tuned by varying the composition of the transparent window.

The components of the 3D SL printing systems described herein can be manufactured by any suitable methods, including but not limited to 3D printing. Other suitable methods of manufacture will be appreciated by those of ordinary skill in the art.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1. EMSL System

Figure 15:
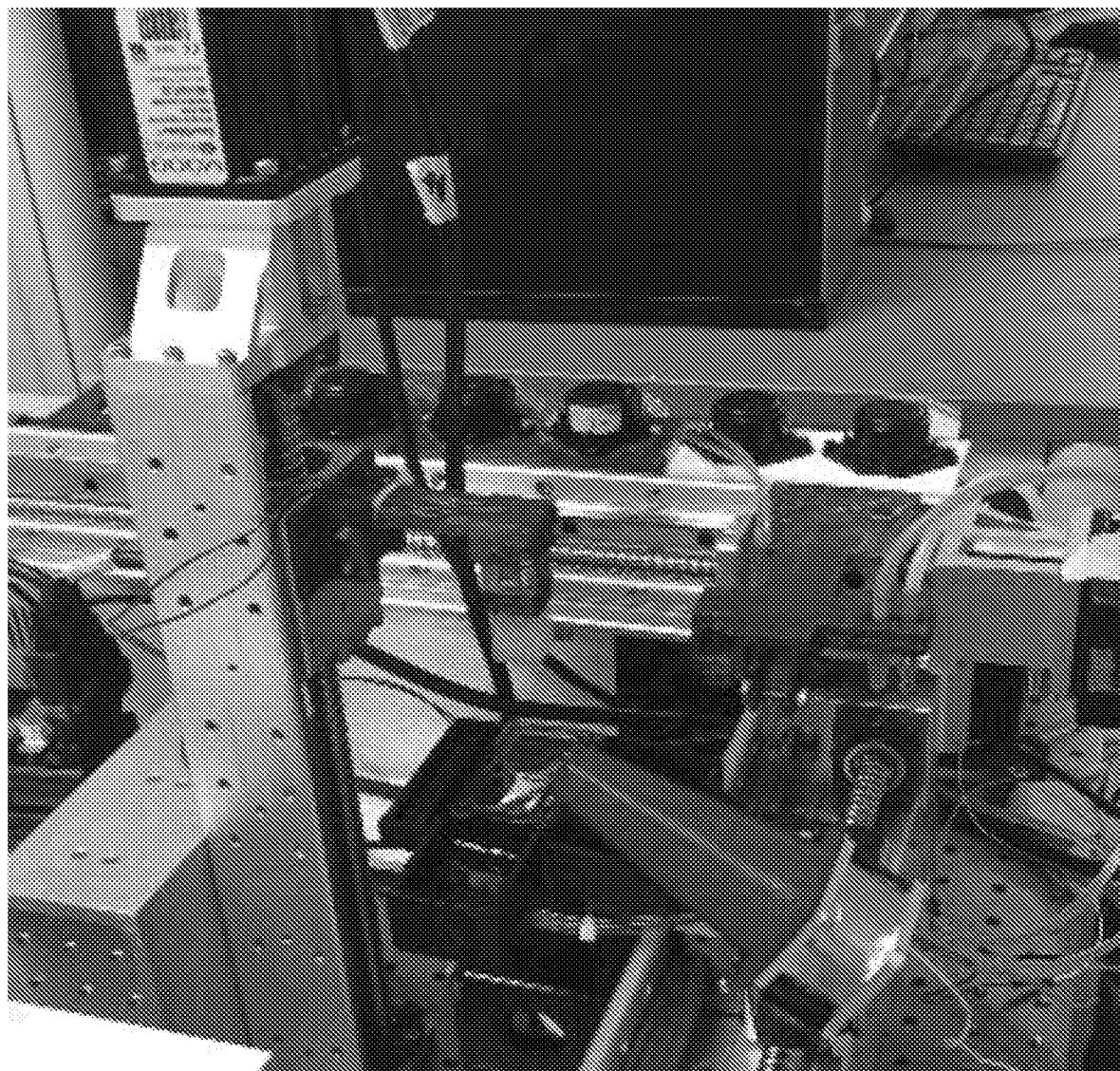
FIG. 15 shows and image demonstrating an embodiment of a 3D printing system described herein.
Figure 16:
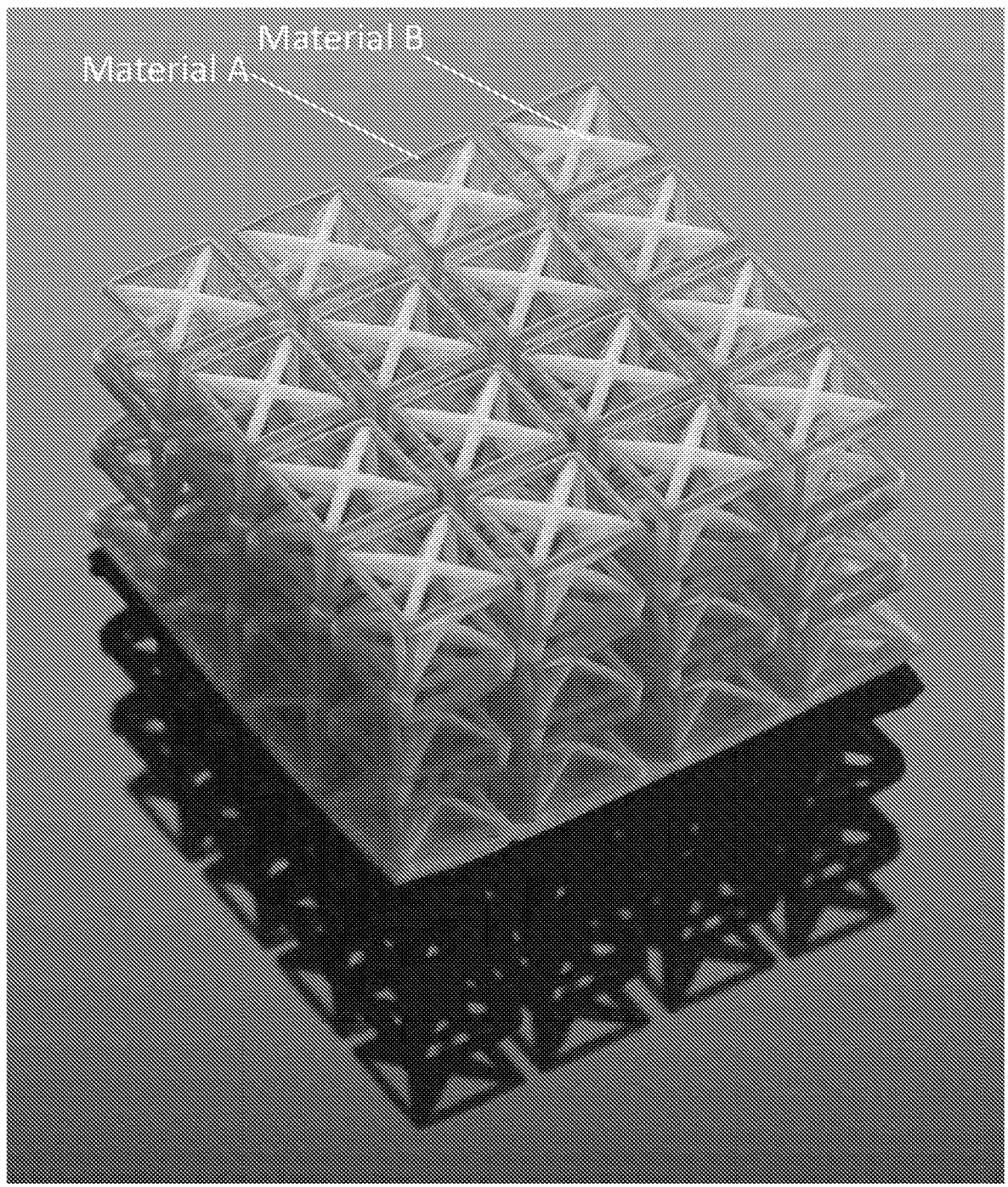
FIG. 16 shows a multi-material 3D object generated from a 3D printing system described herein.
Figure 17:
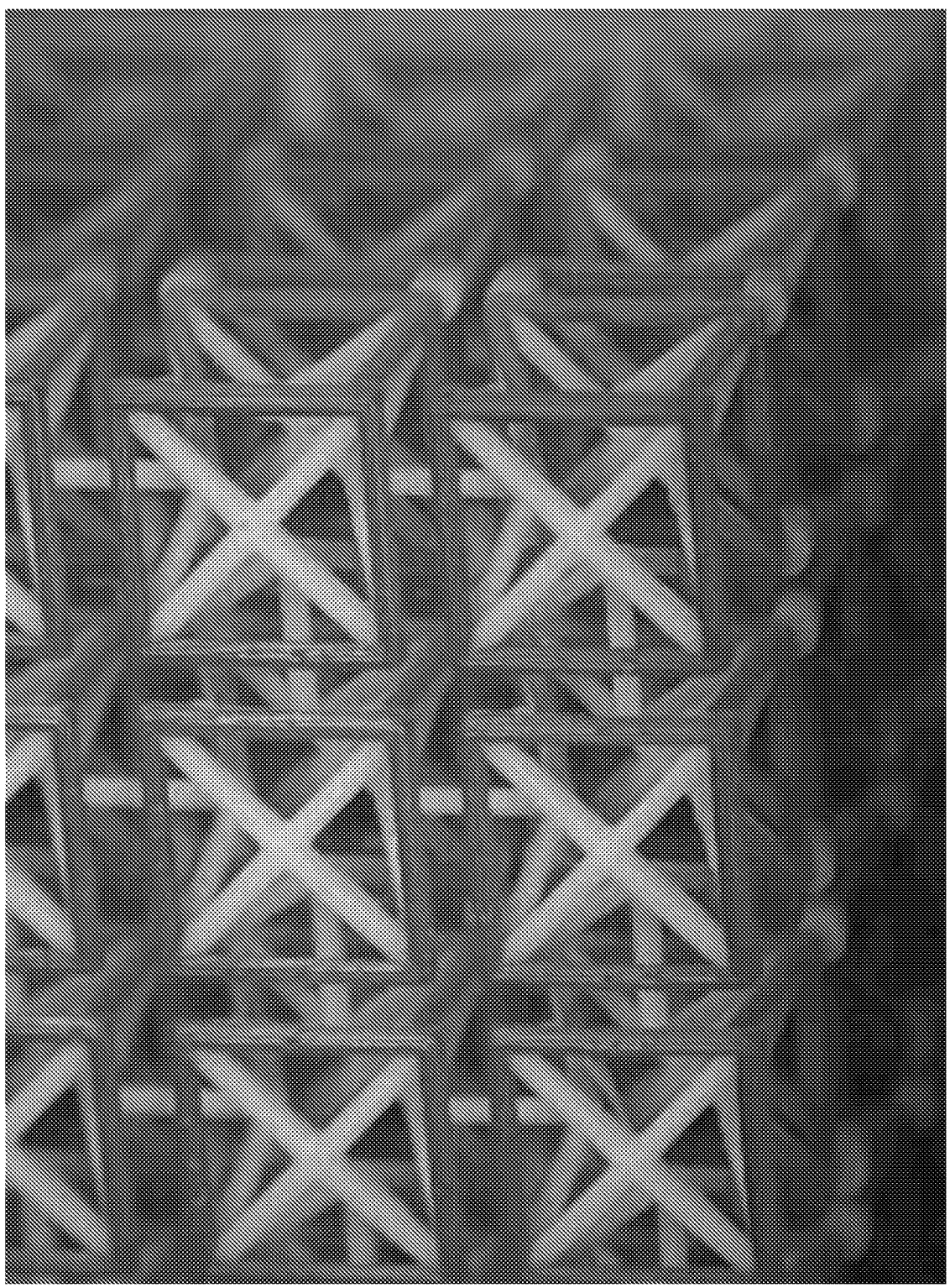
FIG. 17 shows a close-up view of the multi-material 3D object shown in FIG. 16.
Figure 18:
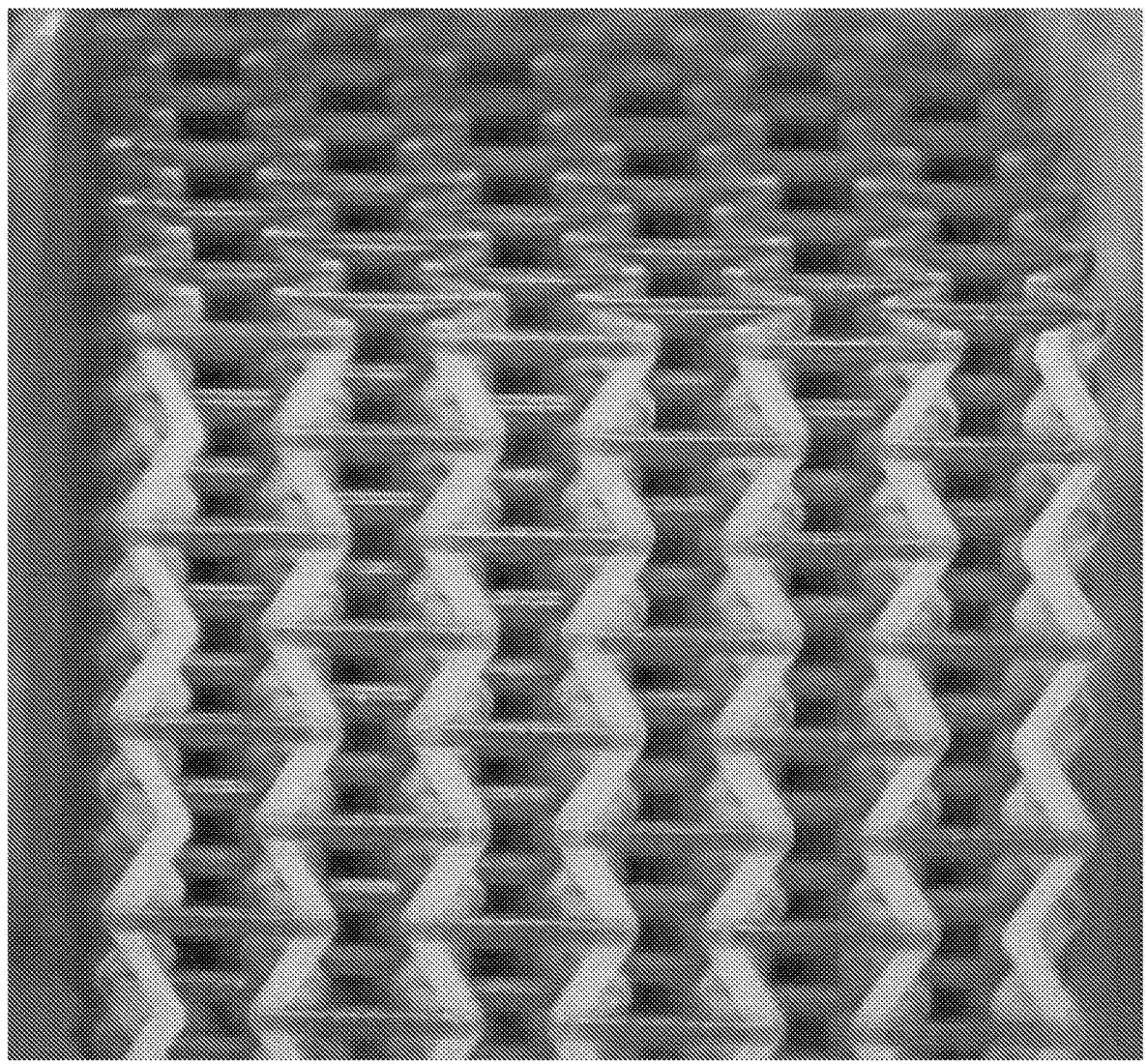
FIG. 18 shows another multi-material 3D object generated from a 3D printing system described herein.
Figure 19:
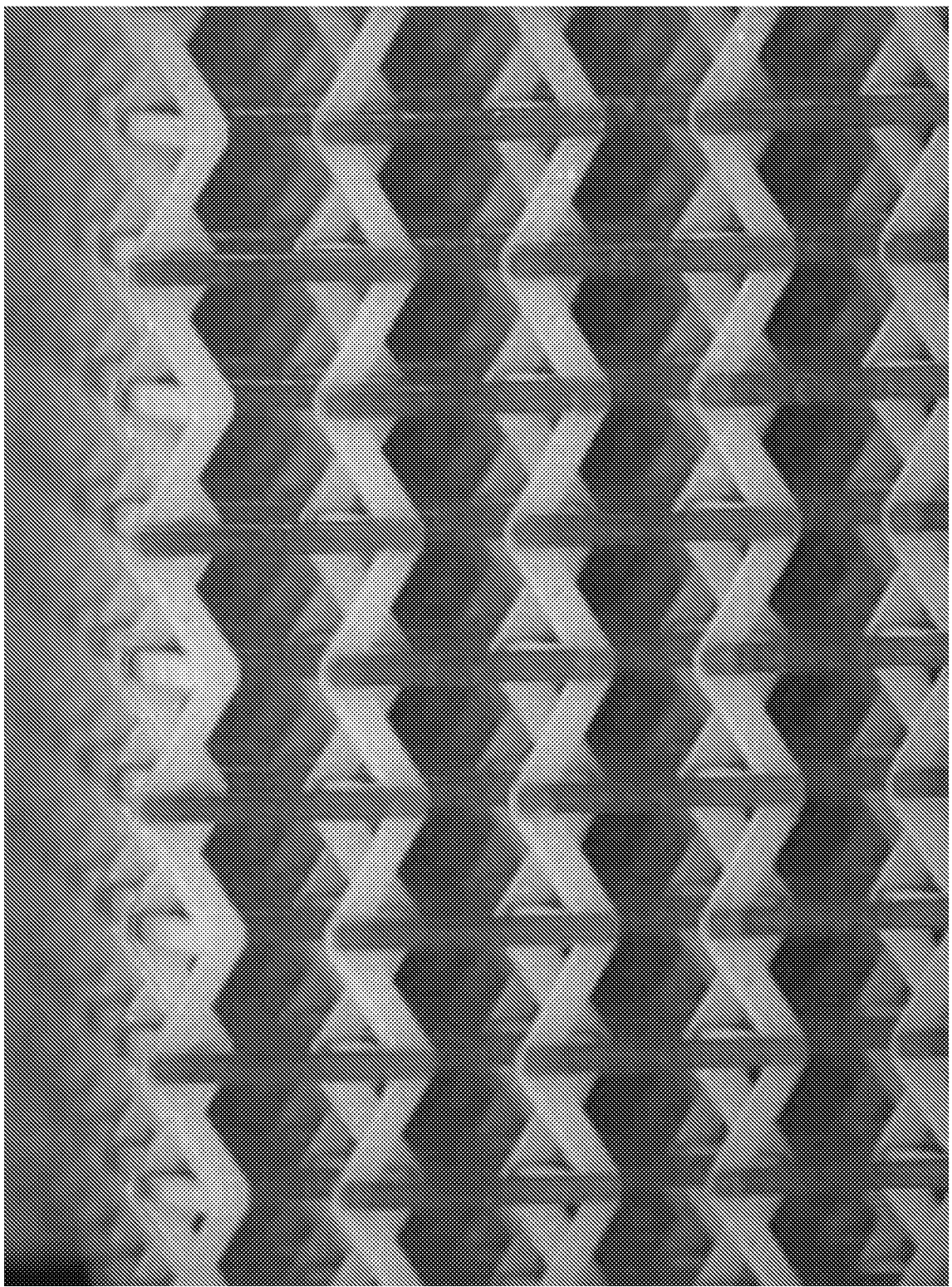
FIG. 19 shows a close-up view of the multi-material 3D object shown in FIG. 17.

A multi-material 3D SL printing system have an X axis cartridge and a Y axis jethead as described herein was generated. FIG. 15 shows an image of such a multi-material 3D SL printing system. The multi-material 3D SL printing system shown in FIG. 15 was used to generate a multi-material 3D structure made of a polymer (dark or blue regions of the images shown in FIGS. 16-19) and a ceramic composite (light or white regions of the images shown in FIGS. 16-19). FIG. 16 shows a multi-material 3D object generated from the multi material 3D printing system shown in FIG. 15. FIG. 17 shows a close-up view of the multi-material 3D object shown in FIG. 15. FIG. 18 shows another multi-material 3D object generated from the mutli-material 3D SL printing system shown in FIG. 15. FIG. 19 shows a close-up view of the multi-material 3D object shown in FIG. 17.

Figure 10:
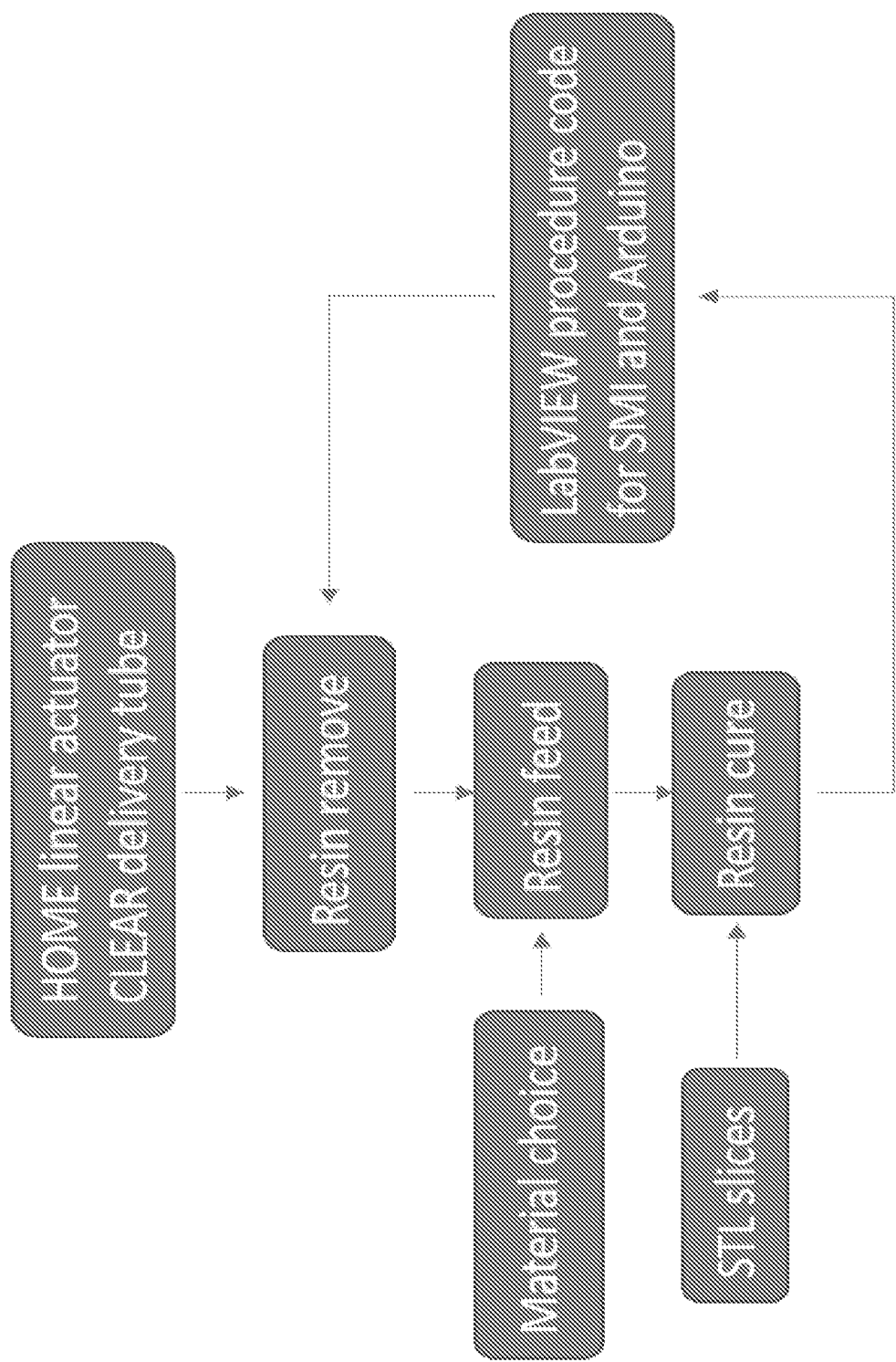
FIG. 10 is a flow chart showing an embodiment of a method of 3D printing using the 3D printing system described herein.
Figure 11:
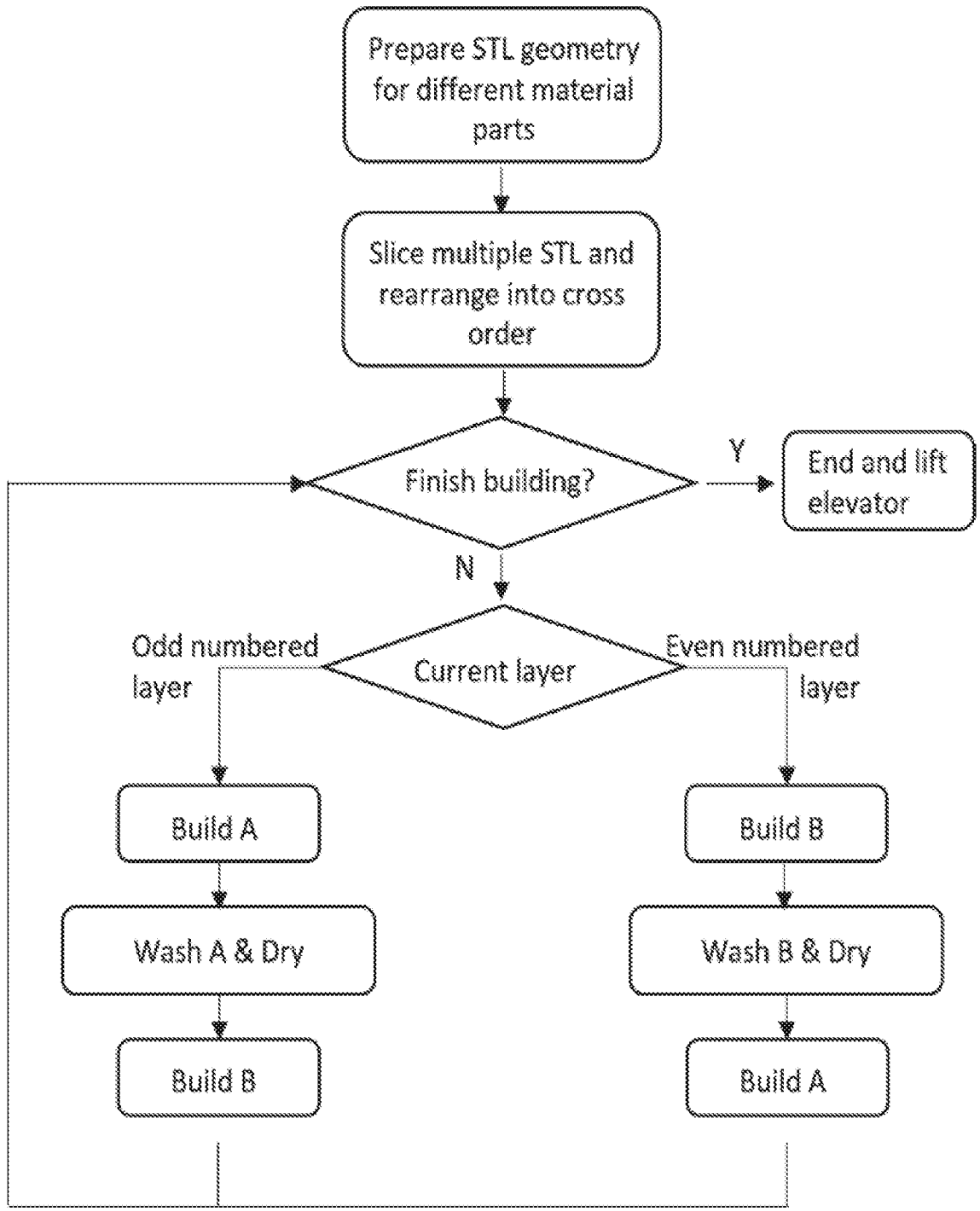
FIG. 11 is a flow chart showing an embodiment of a method of 3D printing using the 3D printing system described herein.

The hardware setup of the multi-material 3D SL printing system (also referred to herein as an EMSL system) shown in FIG. 15 is demonstrated in FIG. 1. In the built system a DMD based UV projector (DLiCel5500 light engine) was used. The use of a commercially available projector can reduce cost and simplify system design. It will be appreciated that a non-commercial optical system, such as the scanning optical projection micro-SL system described and demonstrated elsewhere in herein, can be substituted for the commercial system. The optical lenses of the projector included a pair of tube lenses and beam splitter (Thorlabs). Various projection settings including focus, brightness, and contrast were adjusted to achieve a sharp projection image on the designed projection plane. The DMD resolution in the EMSL system was 1024×768 and the envelope size was set at 20×15 mm. Three linear actuators from MOOG Inc. (L70) were used as the elevator for driving the Z axis and motion controllers for driving the PDMS cartridge and the material jethead in X and Y axis, correspondingly. The linear actuators contain microcontrollers in the driving step motors of the actuators. A lost Arduino micro-controller board and motor shield was used for controlling the elevator vibration motor, the fan, and all other peristaltic pumps. A sheet of PDMS coated coverslip was used as the building platform. Structures were produced according to the general operation demonstrated in FIGS. 10-11.

When based on a commercially available printing head, the optical design of the printing head can be a digital light projection chip or scanning laser, depending on the use. In the EMSL system shown in FIG. 15, a projection chip was used. The optical train included a pair of focusing lenses (Thorlabs ITI200, Infinity-corrected tube lens), a pellicle beam splitter (Thorlabs CMI-BP108) and a kinematic beam tuning cage (Thorlabs DFM102). The tube lens couple adjusted the focal length of the real image and contained an anti-reflective coating. The pellicle directed light to a CCD camera used to check system focus and to monitor the bulid. The 45-degree kinematic beam turning cage directed the real image onto the build plane, which was orthogonal to optical axis.

The LED light source was a 405 nm DLi (Digital Light innovation Inc.) cel5500 light engine. In cel5500 one set of fly's eyes and diffusers were used to condition the light intensity distribution. The light intensity and radiometric power was measured at the liquid monomer surface and can range from 1 mW to 400 mW.

A DLP 5500 DMD display chip (Digital Micro-Mirror Device, TEXAS INSTRUMENTS Inc.) was used as a digital mask in the EMSL system. This imaging forming chip is integrated within cel5500 to reduce the difficulty of EMSL system design. This display has a resolution of 1024×768 pixels over a 11.059 mm by 8.294 mm area. An DLi CELconductor Control Software is connected to Cel5500 light engine to control the display. UV regulation optics adjusts the display pixel by a factor of 1:2, making the final image resolution 19.5 micron/pixel at the projection focal plane.

Briefly, the STL geometry for the different material parts was prepared. Then multiple STL were sliced and rearranged into a cross order. If building the 3D structure was incomplete, then for an odd numbered layer, features made with build material A in that layer were formed, the brushes, transparent window, and structure was washed and dried and then features made with build material B in that layer were formed. For even numbered layers, features made with build material B in that layer were formed, the brushes and transparent window washed and dried and then features made with build material A in that layer were formed. After an even or odd layer was formed, then if the structure was not completed the process of printing the next layer was repeated as described previously. If the structure was complete then the process was ended and the elevator is lifted. In this process, the formed structure was only cleaned during the transitions between building layers in different materials. If a single layer and its next layer is designed to be constructed from the same material, then no cleaning is performed. The EMSL also alternated the building sequence of two materials in neighboring layers (e.g. $A_t$-$B_t$-$B_t$-$B_{t+1}$-$A_{t+1}$) such that less material switchover was needed.

Figure 14A:
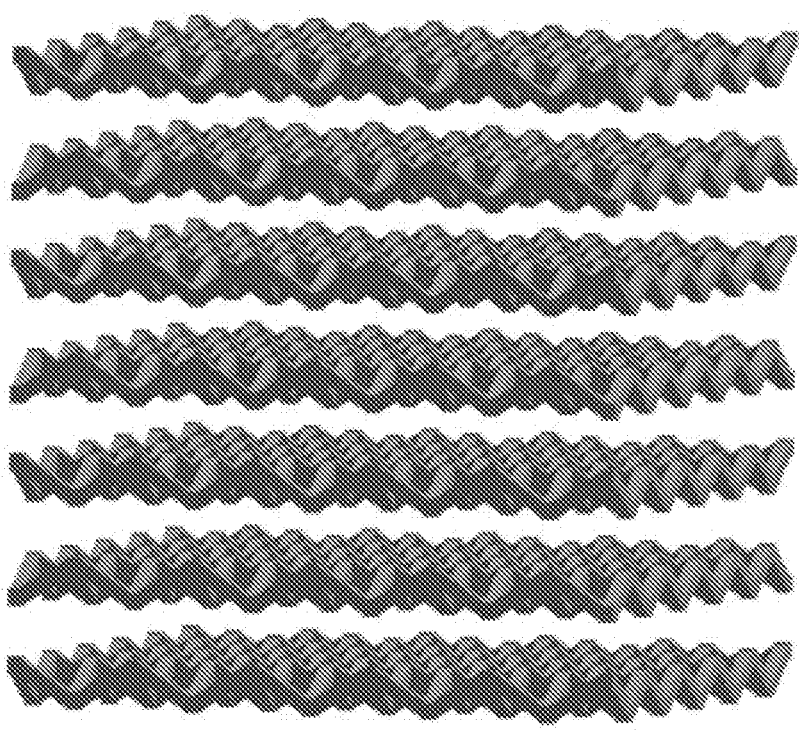
FIGS. 14A and 14B show example slices for a first material (FIG. 14A) and a second material (FIG. 14B) that were used to generate a multi-material 3D printed material.
Figure 14B:
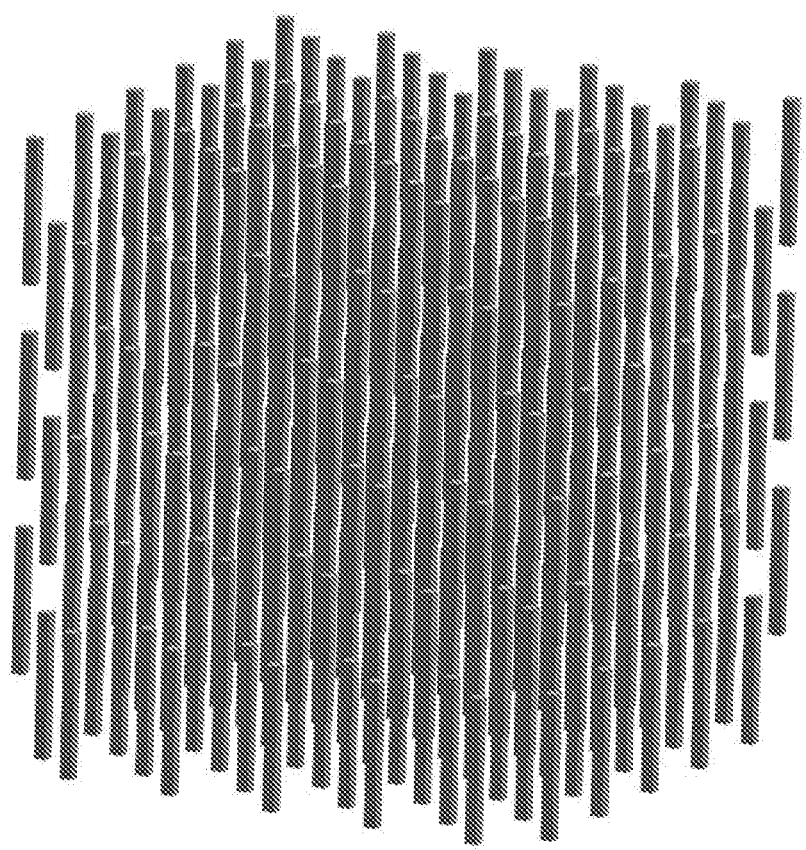

The first step of all 3D printing operations is STL geometry design. As EMSL print models with multiple materials, the geometry and boundary of each material should be defined. As the EMSL system can be configured as a modular system, each material STL was designed in Solidworks and then transformed and assembled into models in netfabb. Different material blocks were assembled in netfabb. The parts should be placed in the right place of the completed model such that the netfabb slices models in the designed height after the sliced bmp files are produced, a MatLab code can be used to rearrange all bmp files in a specially designed sequence. FIGS. 14A and 14B show example slices for a first material (FIG. 14A) and a second material (FIG. 14B).

Figure 12:
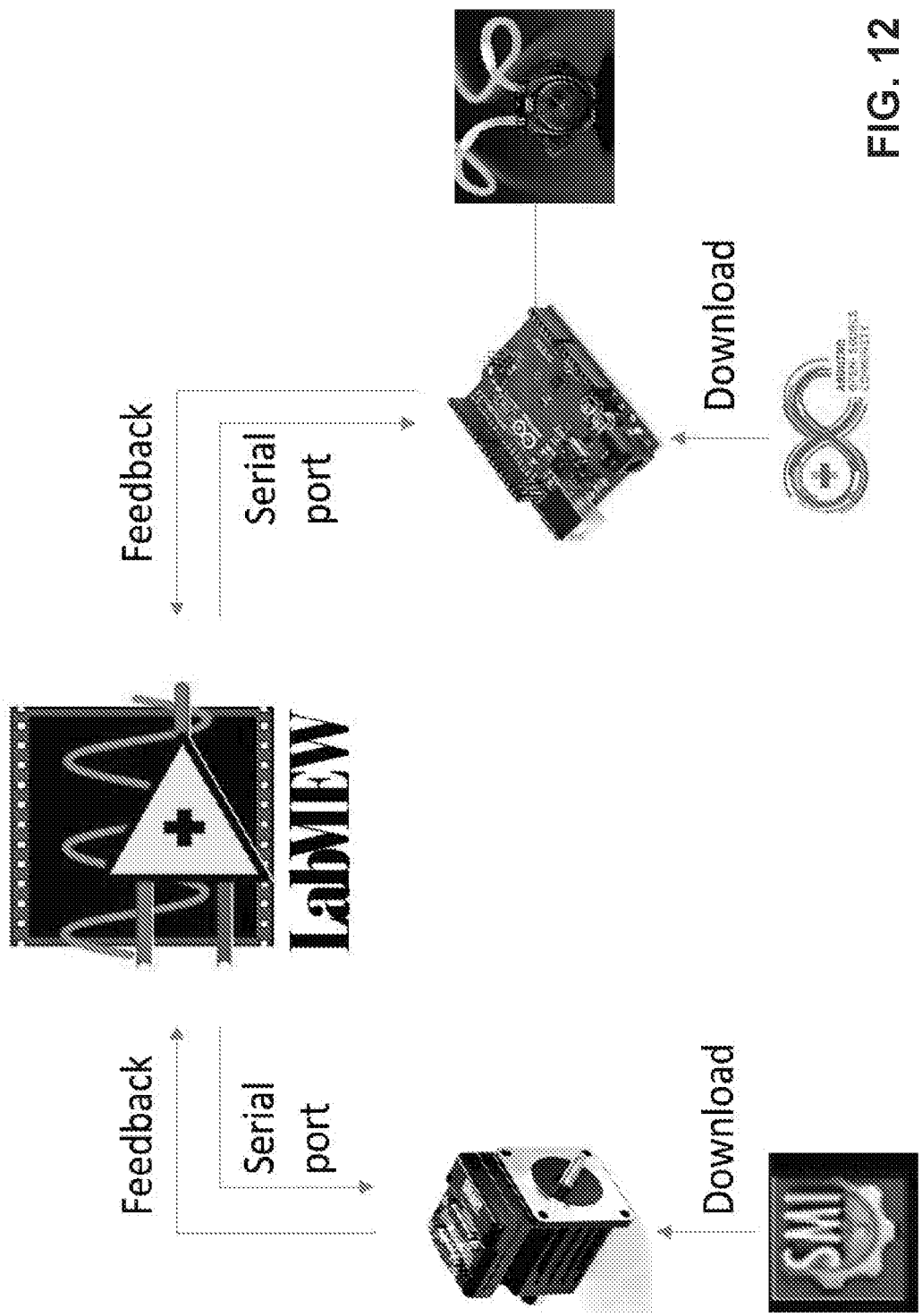
FIG. 12 shows a flow chart demonstrating an embodiment of hardware and computer program modules to operate the 3D printing system described herein.

A multi-material EMSL system was also developed that uses LabVIEW programming language with Arduino and SMI (Moog Smart Motor Interface) as subsystems. As multiple hardware, such as Moog Smart Motors, peristaltic pumps, and 12V fan(s) are operating under the same system, the operating system was built using three major codes. FIG. 12 shows a general flow diagram showing integration of LabVIEW with the EMSL system. In the control panel of LabVIEW code, MOOG Smart Motor micro-controller, and Arduino board are communicating with LabVIEW via the same serial port. The X, Y, Z linear actuator motion code was downloaded into Arduino. These two operating sub-systems were physically separate, but logically linked via LabVIEW.

Figure 13:
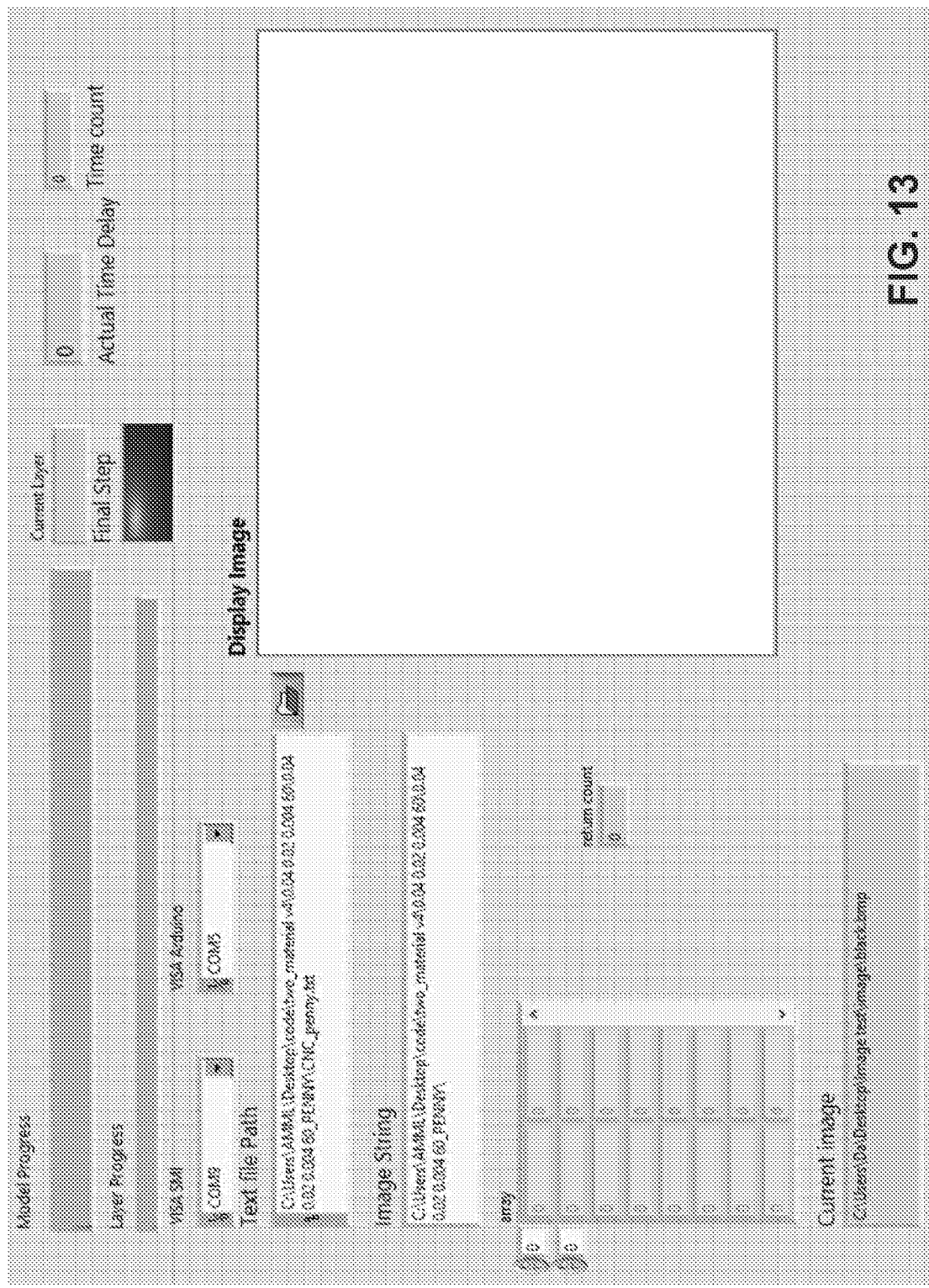
FIG. 13 shows an image of a screen shot of a computer program to operate the 3D printing system described herein.

The main User Interface was written by LabVIEW code. As discussed with respect to STL slicing and bmp image rearranging steps above, the processed bmp folder was linked to LabVIEW. Another numerical control file describing layer exposure time was written and also linked into LabVIEW. In the LabVIEW front panel, users can monitor for model completion rate and layer completion rate. FIG. 13 shows a screen shot of a LabVIEW based User Interface demonstrating features described above.

Example 2. Scanning Optical Projection Micro-SL System

Many applications would benefit from a capability to quickly create very complex shapes and small features. However current SLA machines have limitations that do not allow for such manufacturing of 3D structures. However these techniques involve tradeoffs between the overall part size, the speed of manufacturing, and the level of detail achievable.

This Example can demonstrate a scanning optical projection Micro-SL system that can include a projector that is coordinated with an optical scanning system to produce large-scale part with micro-scale features. Parts produced using this system can be used as microfluidic devices, microsystems, injection molding, thermoforming, blow molding, and various metal-casting processes. The system can be used to quickly make these large parts with great complexity and detail. The increased speed and ability to manufacture parts with small features in a large-sized product distinguish scanning optical AM from competing 3D printing techniques.

A scanning optical projection Micro SL system was generated. Briefly, a projector was coordinated with an optical scanning system. A section of the image from the projector was directed across two mirrors and onto a photosensitive printing material. As the mirrors move on the x axis or y axis, 2D patterns can be reflected onto a new area next to the previously exposed area. The pattern change on the projector can be coordinated with the scanning rate of the scanning mirror system. A focusing lens can be used below the scanning mirror to project the image onto the surface of the uncured liquid printing material. The pattern is updated as the image is moved via the scanning optics to effectively create a continuous image in the photosensitive material. As the scanned image is much larger than a single image of the projector small feature sizes over a large area can be obtained. This technique can allow for fabrication of a 3D structure of a polymer architected material that is hundreds of millimeters or more in size having multiscale features down to the sub-10 µm scale or less. Various embodiments of the configuration of the scanning optical projection Micro SL system are demonstrated in e.g. FIGS. 20-21 and 25-27 discussed in greater detail elsewhere herein.

Figures 22A, 22B, 22C, 22D, 22E, 22F, 22G, 22H, 22I:
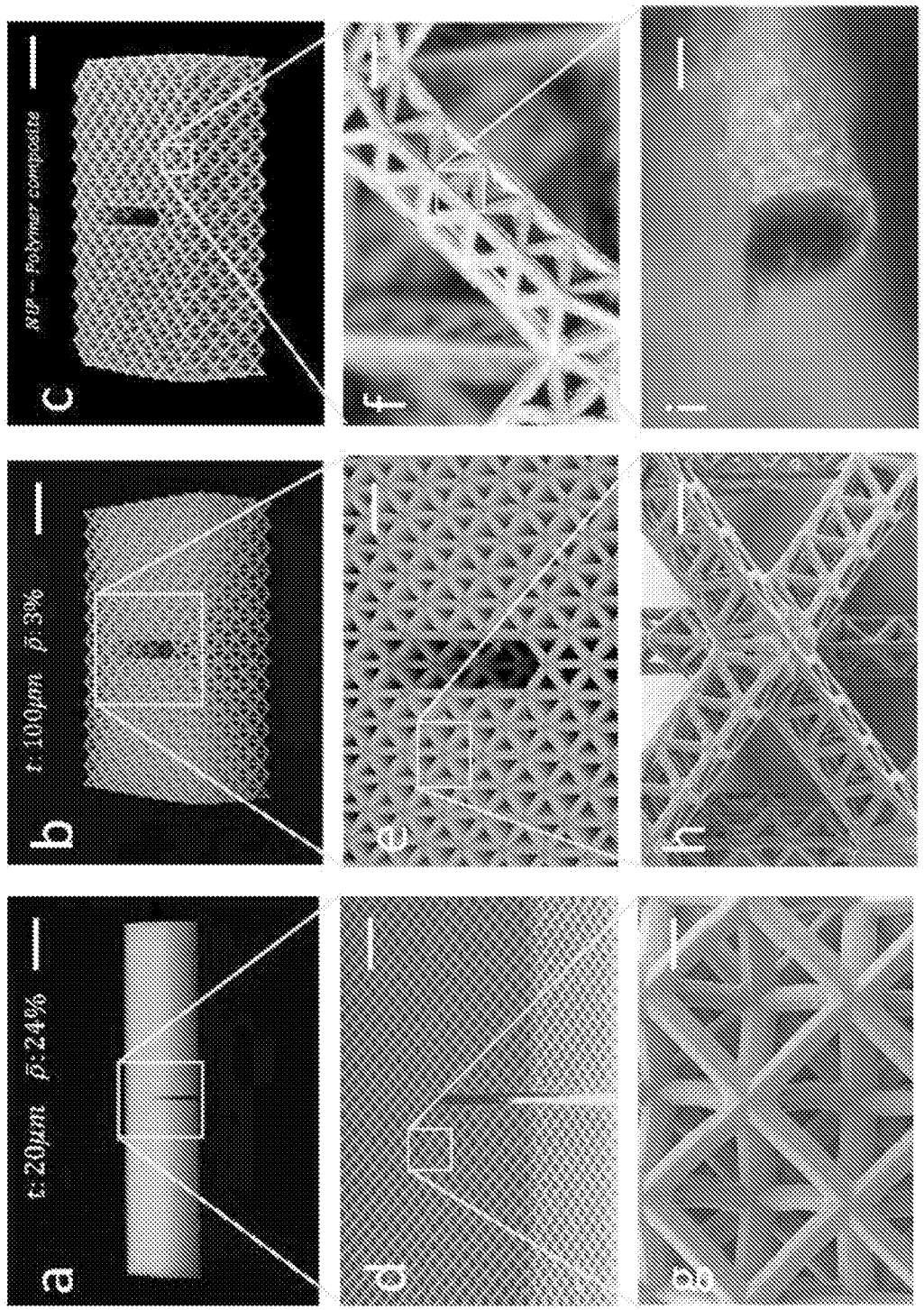
FIGS. 22A-22C show optical microscopic images of composite or non-composite metamaterials architected with periodic or hierarchical micro-structures that can have pre-fabricated single edge notch or a center notch.
FIGS. 22D-22I show scanning electron micrographs for metamaterials at different magnification levels. The scale bars are as follows.

Recent studies have shown the excellent performance strength and stiffness of cellular materials architected with stretch-dominaed micro-architectures, which is conducive in creating lightweight, strong, and stiff engineering materials. The scanning optical projection micro SL system described herein is uniquely suitable for fabricating such materials, as the micro-features of the material can be controlled through over four orders of magnitude (from hundreds of millimeters to tens of micrometers). FIGS. 22A-24D show several samples fabricated by the scanning optical projection micro SL system described herein. FIGS. 22A-22I show microscopic images showing the large scale structures with microscale features produced by a scanning optical projection Micro SL system described herein. More specifically, FIGS. 22A-22C show optical microscopic images of composite or non-composite metamaterials architected with periodic or hierarchical micro-structures that can have prefabricated single edge notch or a center notch. FIGS. 22D-22I show scanning electron micrographs for metamaterials at different magnification levels.

Figures 23A, 23B:
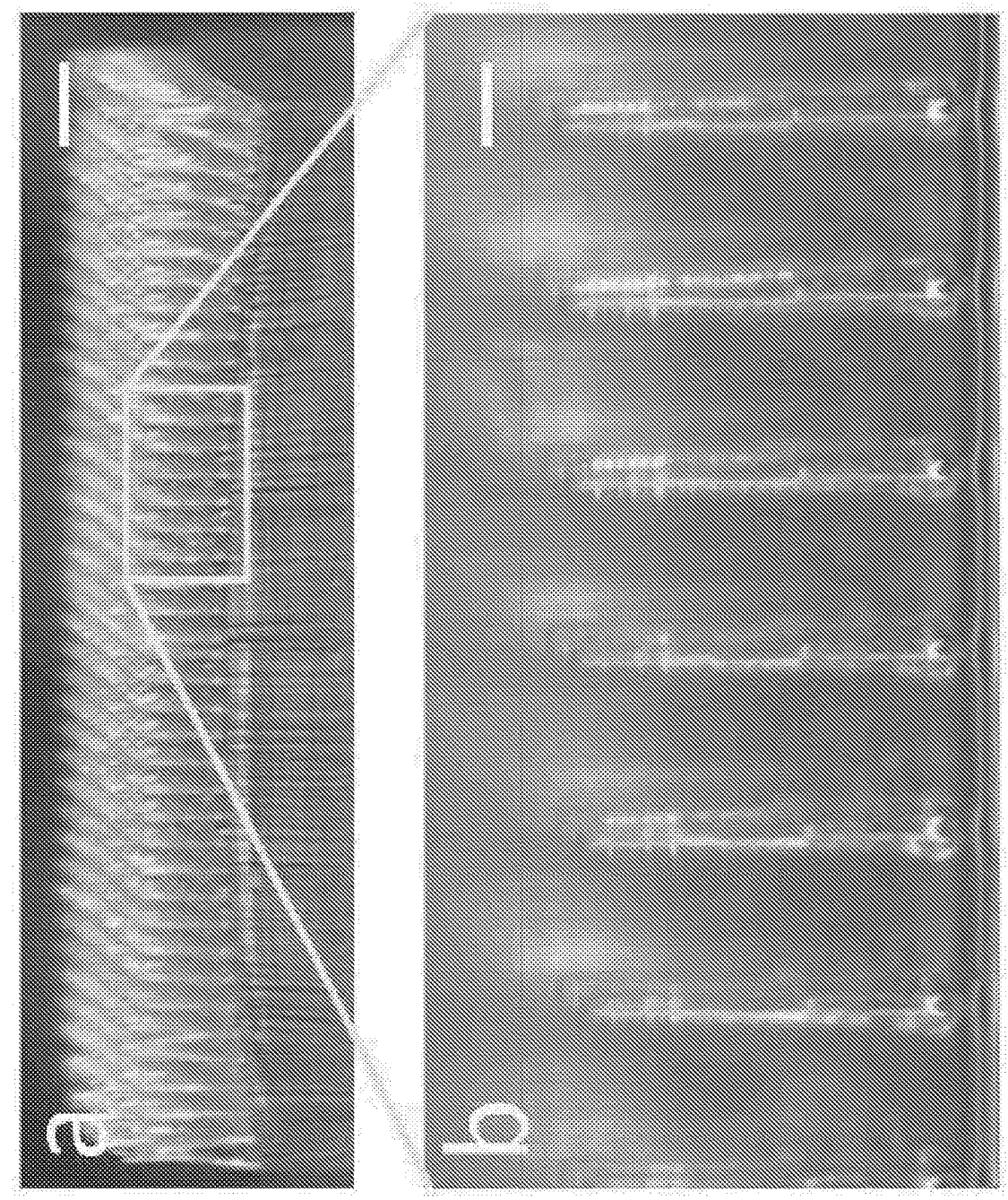
FIGS. 23A and 23B show an optical microscopic image (FIG. 23A) of a microfluidic chip with columnar pillars and a magnified optical image (FIG. 23B) of the micro pillars of the microfluidic chip that was manufactured using a scanning optical micro-SL system described herein.

Unlike mask and soft lithography processes that require expensive facilities and clean room environments, the scanning optical projection micro SL system can print transparent, microfluidic chips through video playing within 1 hour. FIGS. 23A and 23B show an optical microscopic image (FIG. 23A) of a microfluidic chip with columnar pillars and a magnified optical image (FIG. 23B) of the micro pillars of the microfluidic chip that was manufactured using a scanning optical micro-SL system described herein. The microchip has features spanning from tens of micrometers to centimeters.

Figure 24A:
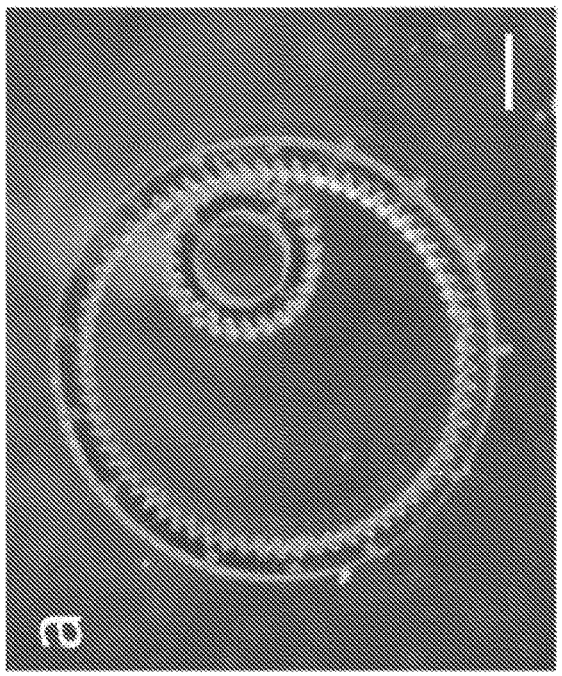
FIGS. 24A-24D show optical microscopic images of a pre-ceramic gear set (FIG. 24A), a pre-ceramic close cell foam (FIG. 24B), and a SiC open cell foam (FIGS. 24C-24D). The scale bars are as follows.

Silicon carbide ceramic (SiC) exhibits excellent properties such as low density and high strength and high stiffness. Thus, SiC has a myriad of applications including, but not limited to, applications within the aviation and aerospace fields. Gears printed with pre-SiC are shown in FIG. 24A.

Figure 24B:
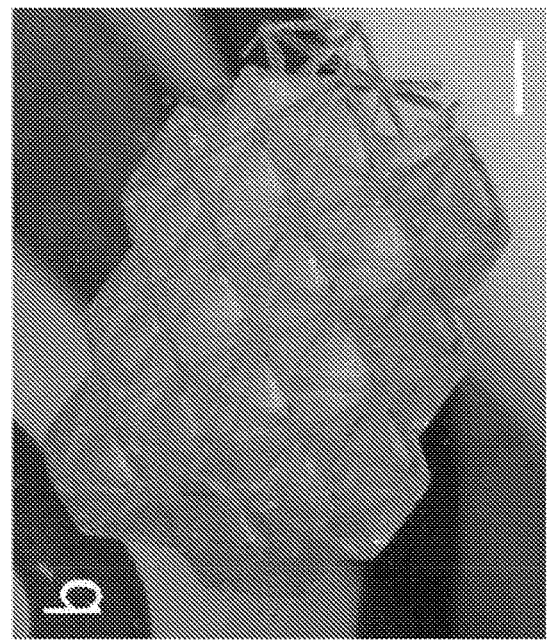
Figure 24C:
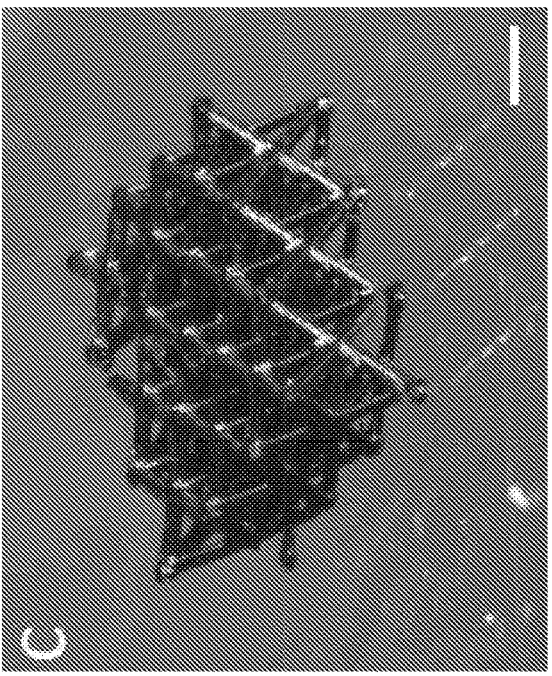
Figure 24D:
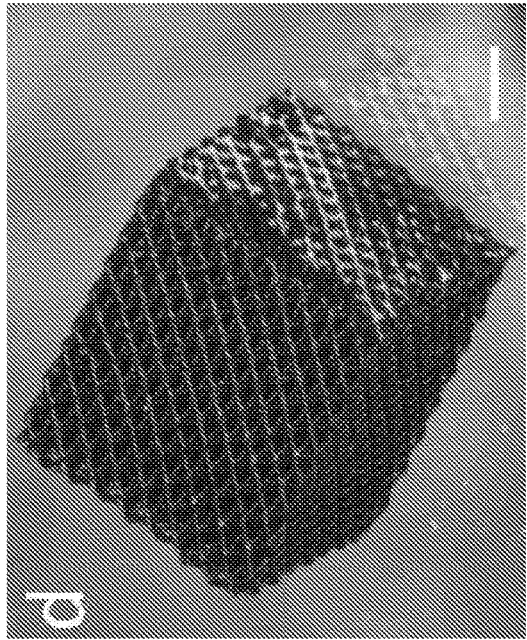
Figure 25:
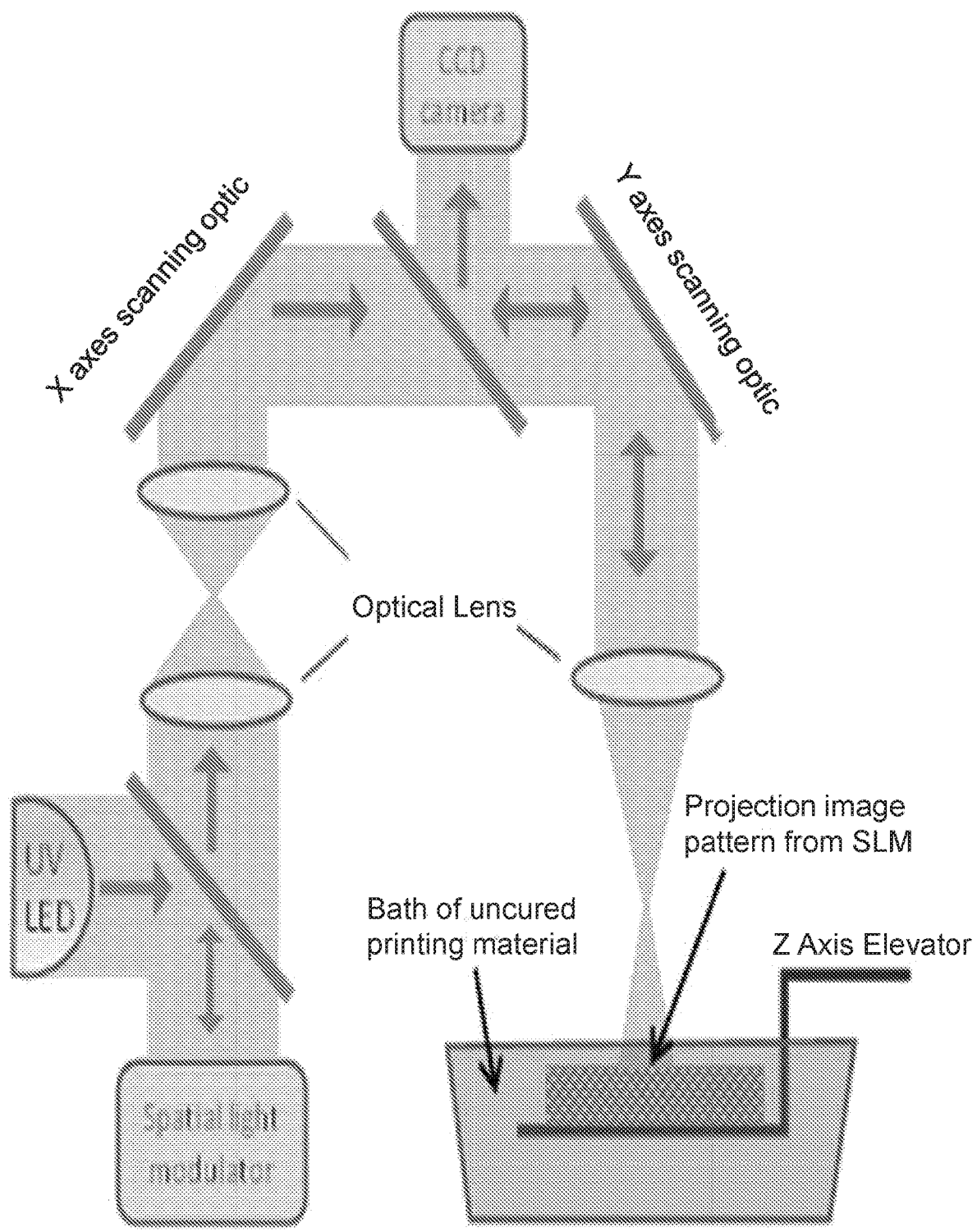
FIG. 25 shows an embodiment of a scanning optical micro-SL system.
Figure 26:
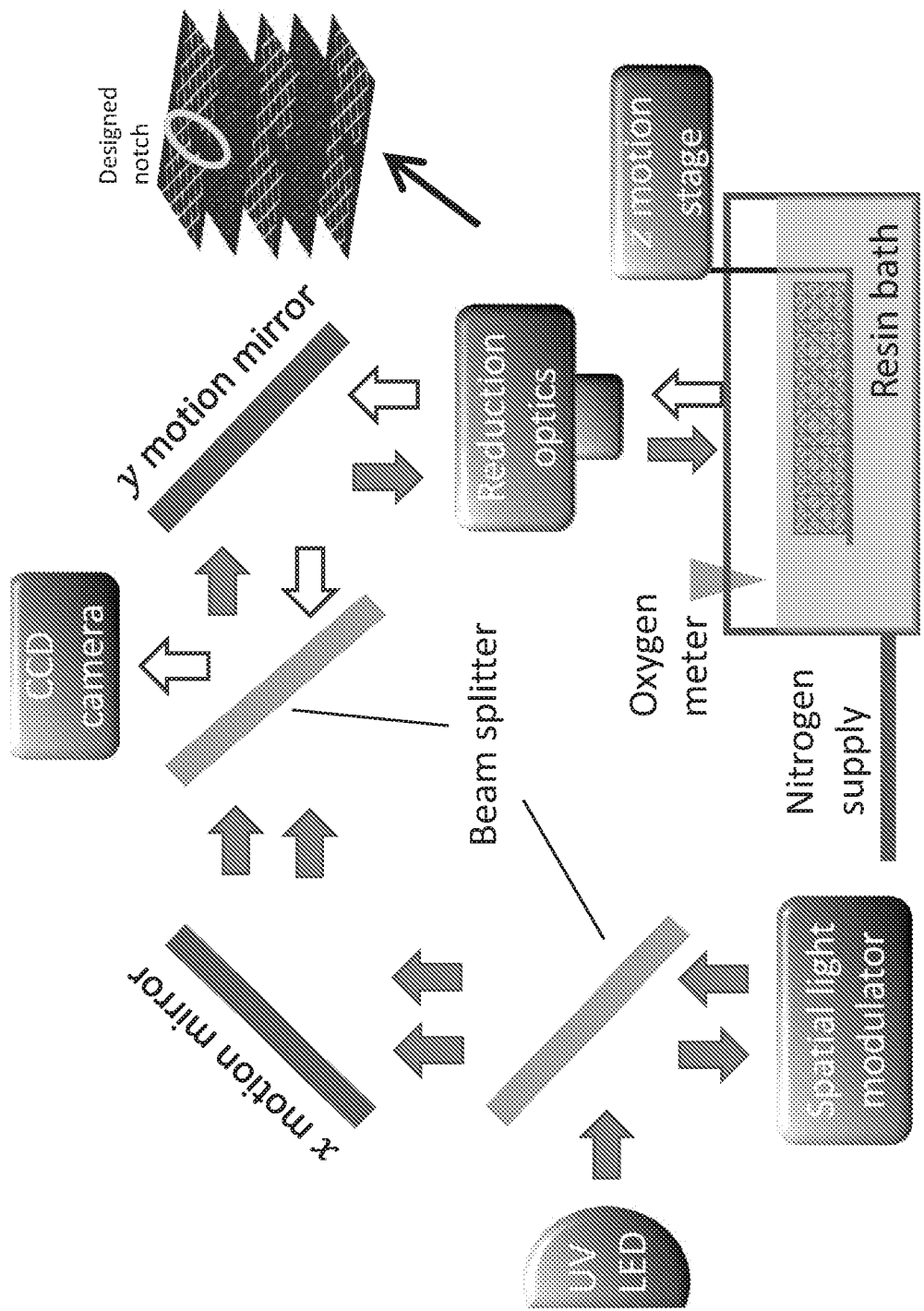
FIG. 26 shows another embodiment of a scanning optical micro-SL system.
Figure 27:
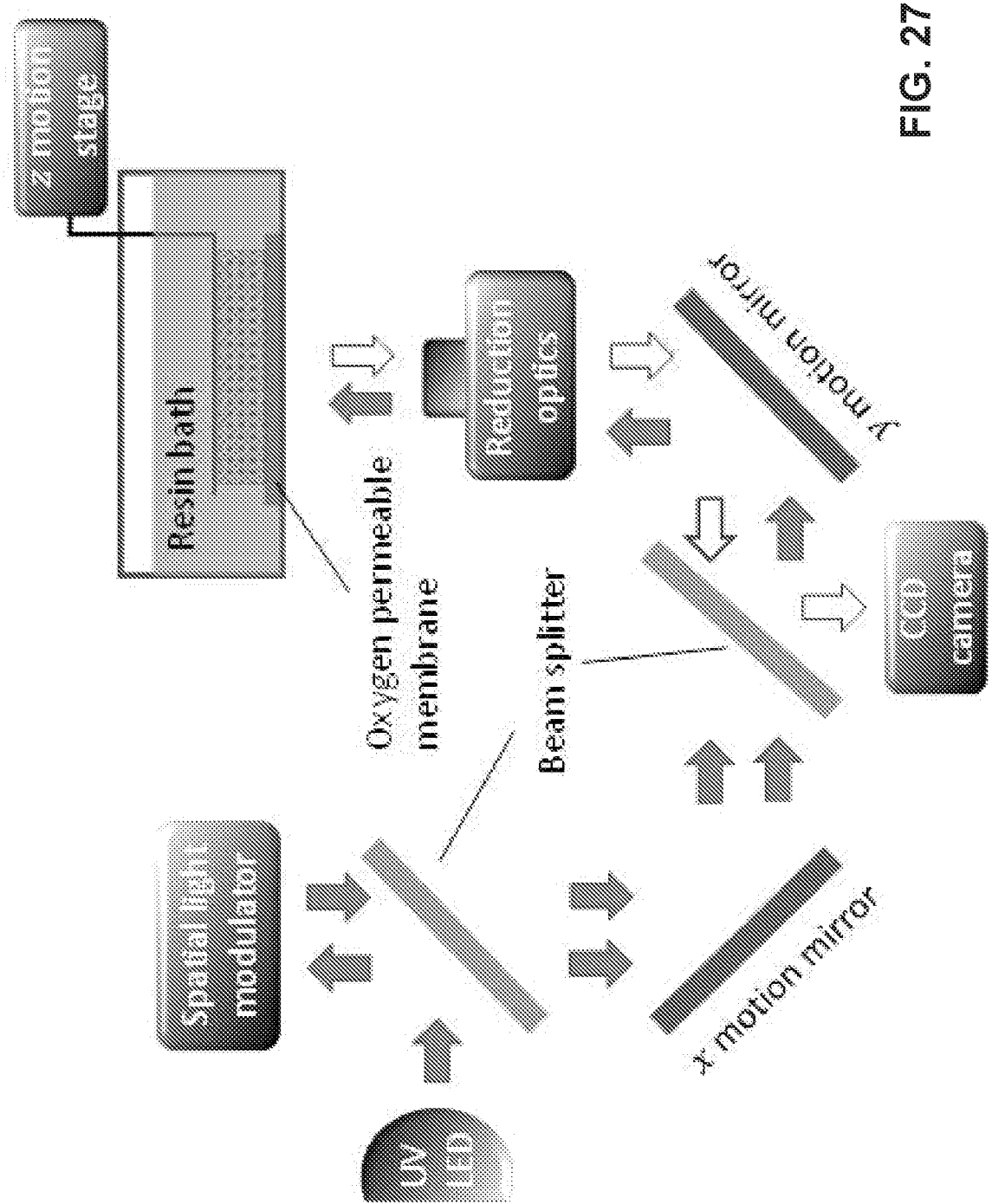
FIG. 27 shows another embodiment of a scanning optical micro-SL system.

To further decrease the density of such a material, while maintaining an acceptable deduction of the strength a fabricated SiC architected lattice, which achieve near mximal theoretical specific elastic strength and stiffness while having foam structures were generated. The pre-ceramic close cell foam and an SiC open cell foam are shown in FIG. 24B and FIGS. 24C-24D, respectively.

I claim:

1. A multi-material 3D additive manufacturing system comprising:
   a Y-axis jethead, wherein the Y-axis jethead comprises:
     a Y-axis jethead body portion;
     one or more printing material dispensers that are each coupled to one or more feedstock material reservoirs and the Y-axis jethead body portion; and
     a cleaning unit comprising a cleaning solution dispenser, wherein the cleaning solution dispenser is coupled to the Y-axis jethead body portion;
   an X-axis cartridge, wherein the X-axis cartridge comprises:
     an X-axis cartridge body portion;

a transparent window, wherein the transparent window is coupled to the X-axis cartridge body portion;

a first fin and a second fin, wherein the first fin and the second fin are coupled to the X-axis cartridge body portion such that the first fin and the second fin are on opposite sides of the transparent window; and a fluidic channel system, wherein the fluidic channel system is coupled to the X-axis cartridge body portion and wherein the fluidic channel system is configured to receive cleaning solution that is dispensed from the cleaning solution dispenser and is further configured to remove used cleaning solution from the transparent window.

2. The multi-material 3D additive manufacturing system of claim 1, wherein the cleaning unit further comprises
a brush, wherein the brush is coupled to the Y-axis jethead body portion.

3. The multi-material 3D additive manufacturing system of claim 2, wherein
the cleaning solution dispenser is coupled to the Y-axis jethead body portion such that, when in operation, cleaning solution that is dispensed from the cleaning solution dispenser contacts the brush.

4. The multi-material 3D additive manufacturing system of claim 1, wherein the Y-axis jethead is configured such that the brush contacts the first and the second fins twice per motion of the Y-axis jethead during operation.

5. A multi-material 3D additive manufacturing system comprising:
a Y-axis jethead, wherein the Y-axis jethead comprises:
a body portion;
one or more printing material dispensers that are each coupled to feedstock material reservoirs and the body portion;
a brush, wherein the brush is coupled to the body portion
a cleaning solution dispenser; wherein the cleaning solution dispenser is coupled to the body portion such that when in operation cleaning solution that is dispensed from the cleaning solution dispenser contacts the brush;
an X-axis cartridge, wherein the X-axis cartridge comprises:
a body portion;
a transparent window, wherein the transparent window is coupled to the body portion;
a first fin and a second fin, wherein the first fin and the second fin are coupled to the body portion such that the first fin and the second fin are on opposite sides of the transparent window; and
a fluidic channel system, wherein the fluidic channel system is coupled to the body portion and wherein the fluidic channel system is configured to receive cleaning solution that is dispensed from the cleaning solution dispenser and is further configured to remove used cleaning solution from the transparent window,
and wherein the brush contacts the first and the second fins twice per motion of the Y-axis jethead during operation.

6. The multi-material 3D additive manufacturing system of claim wherein the brushes are polydimethylsiloxane.

7. The multi-material 3D additive manufacturing system of claim 5, wherein the transparent window is polydimethylsiloxane.

8. The multi-material 3D additive manufacturing system of claim 5, wherein the one or more printing material dispensers are configured to deliver one or more printing materials, and wherein the one or more printing materials can be selected from the group of a polymer, a ceramic, a metal, a metal alloy, a biomaterial, a nanostructured agent, a protein, a nucleic acid, an enzyme, a multi-element, a pigment, a multi-biomolecule, or any combination thereof.

9. The multi-material 3D additive manufacturing system of claim 5, further comprising a third fin, wherein the third fin is operatively coupled to the body portion of the X-axis cartridge on the same side of the transparent window as the second fin.

10. The multi-material 3D additive manufacturing system of claim 5, further comprising an optical print head system, wherein the optical print head system is optically coupled to the transparent window.

11. The multi-material 3D additive manufacturing system of claim 10, wherein the optical print head system is a scanning projection micro stereolithography system.

12. The multi-material 3D additive manufacturing system of claim 5, further comprising
a light source;
a mirror system comprising at least two mirrors configured to scan the structure being generated, wherein at least one mirror is optically coupled to the light source, and the mirror system is continuously moving during continuously curing a printing material;
a bath of uncured printing material, wherein the bath of uncured printing material is optically coupled to the mirror system;
a beam splitter, wherein the beam splitter is optically coupled to the mirror system; and
a video camera, wherein the video camera is optically coupled to the mirror system, and the beam splitter;
a projector, wherein the projector is optically coupled to the bath of uncured printing material and is configured to project continuous video of intergraded image of a subsection of a computer generated layer of product to be printed on the uncured printing material.

13. The multi-material 3D additive manufacturing system of claim 12, further comprising
a body portion;
one or more printing material dispensers that are each coupled to one or more feedstock material reservoirs and the body portion; and
at least one cleaning unit configured to clean a printed object, a printing platform, a component of the X-axis cartridge, or any combination thereof.

* * * * *